(12) United States Patent
Smith

(10) Patent No.: US 12,349,629 B2
(45) Date of Patent: Jul. 8, 2025

(54) AUTONOMOUS LAWN MOWER BLADE SHARPENING AND TASK ROBOT

(71) Applicant: OrbiSharp Robotics, Inc., Monkton, MD (US)

(72) Inventor: Brian F. Smith, Monkton, MD (US)

(73) Assignee: OrbiSharp Robotics, Inc., Monkton, MD (US)

( * ) Notice: Subject to any disclaimer, the term of this patent is extended or adjusted under 35 U.S.C. 154(b) by 1365 days.

(21) Appl. No.: 16/928,661

(22) Filed: Jul. 14, 2020

(65) Prior Publication Data

US 2021/0007281 A1 Jan. 14, 2021

Related U.S. Application Data

(60) Provisional application No. 62/873,963, filed on Jul. 14, 2019.

(51) Int. Cl.
| | | |
|---|---|---|
| *A01D 75/00* | (2006.01) | |
| *A01D 101/00* | (2006.01) | |
| *B24B 3/36* | (2006.01) | |
| *B24B 51/00* | (2006.01) | |
| *B25J 5/00* | (2006.01) | |
| *B25J 9/16* | (2006.01) | |
| *B25J 11/00* | (2006.01) | |
| *B25J 19/02* | (2006.01) | |

(52) U.S. Cl.
CPC .............. *A01D 75/00* (2013.01); *B24B 3/365* (2013.01); *B24B 51/00* (2013.01); *B25J 5/00* (2013.01); *B25J 9/1679* (2013.01); *B25J 11/0065* (2013.01); *B25J 19/021* (2013.01); *A01D 2101/00* (2013.01)

(58) Field of Classification Search
CPC .. A01D 75/00; A01D 2101/00; A01D 34/001; B24B 3/365; B24B 51/00; B25J 5/00; B25J 9/1679; B25J 11/0065; B25J 19/021; B25J 11/005; B25J 11/0085; B25J 19/023
See application file for complete search history.

(56) References Cited

U.S. PATENT DOCUMENTS

| | | | | |
|---|---|---|---|---|
| 2,142,669 | A * | 1/1939 | Carpenter | B24B 3/42 |
| | | | | 451/380 |
| 2,854,807 | A * | 10/1958 | Byler | A01D 34/73 |
| | | | | 56/295 |
| 6,452,400 | B1 * | 9/2002 | Kawai | H05H 1/0081 |
| | | | | 324/630 |

(Continued)

*Primary Examiner* — Lawrence Averick
(74) *Attorney, Agent, or Firm* — Amsel IP Law PLLC; Jason Amsel

(57) ABSTRACT

A lawn mower blade sharpening and task robot that autonomously drives under a lawn mower including a body, at least one motor, and a microprocessor. The robot also includes at least one a camera for object recognition and visualization of at least one of the lawn mower, a lawn mower deck, a lawn mower blade, and a lawn mower blade cutting edge, and at least one a sensor to sense the lawn mower, the lawn mower deck, the lawn mower blade, and lawn mower cutting edge. The robot may also include at least one of a task tool, a task arm, a task tip, and a task element in order to complete tasks such as sharping lawn mower blades and cleaning lawn mower blades.

20 Claims, 29 Drawing Sheets

(56) References Cited

U.S. PATENT DOCUMENTS

| | | | | |
|---|---|---|---|---|
| 6,631,658 B2* | 10/2003 | Brown | ................ | B23D 63/001 76/75 |
| 7,231,849 B2* | 6/2007 | Beattie | ..................... | B24B 3/42 83/174 |
| 8,348,722 B2* | 1/2013 | Arnold | .................. | B24D 15/06 451/523 |
| 9,776,297 B2* | 10/2017 | Veenendall | ............... | B24B 3/42 |
| 9,827,644 B2* | 11/2017 | Selles | ..................... | B24B 3/42 |
| 10,220,482 B2* | 3/2019 | Veenendall | ............. | B24B 3/365 |
| 10,661,406 B2* | 5/2020 | Graves | ................. | B24D 15/081 |
| 11,044,844 B2* | 6/2021 | Keski-Luopa | ....... | A01D 34/008 |
| 11,058,053 B2* | 7/2021 | Patel | ................... | A01D 34/828 |
| 11,092,527 B1* | 8/2021 | Graves | ................... | G01N 3/58 |
| 11,778,942 B2* | 10/2023 | Keski-Luopa | ......... | A01D 69/06 56/10.2 A |
| 2002/0078796 A1* | 6/2002 | Brown | ................. | B23D 63/12 76/37 |
| 2004/0128812 A1* | 7/2004 | Beattie | ................... | B24B 49/00 29/10 |
| 2011/0201258 A1* | 8/2011 | Arnold | .................. | B24B 3/365 451/558 |
| 2016/0229020 A1* | 8/2016 | Veenendall | ............. | B24B 3/365 |
| 2016/0263720 A1* | 9/2016 | Selles | .................... | B24B 3/365 |
| 2018/0036855 A1* | 2/2018 | Veenendall | ............... | B24B 3/42 |
| 2018/0255705 A1* | 9/2018 | Keski-Luopa | ....... | A01D 34/008 |
| 2019/0193227 A1* | 6/2019 | Veenendall | ............. | B24B 3/365 |
| 2019/0210177 A1* | 7/2019 | Graves | .................. | B24B 55/02 |
| 2019/0297777 A1* | 10/2019 | Patel | ................... | A01D 34/828 |
| 2021/0337726 A1* | 11/2021 | Keski-Luopa | ....... | A01D 34/008 |
| 2024/0032464 A1* | 2/2024 | Keski-Luopa | ......... | A01D 69/02 |

* cited by examiner

FIG. 9A  FIG. 9B  FIG. 9C  FIG. 9D  FIG. 9E  FIG. 9F
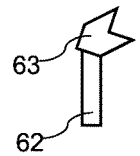 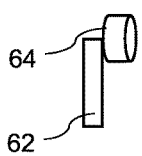 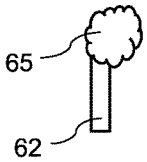 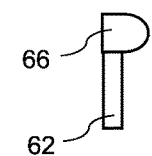 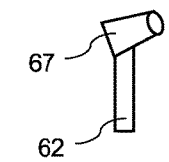 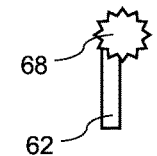
FIG. 9G  FIG. 9H  FIG. 9I  FIG. 9J  FIG. 9K  FIG. 9L
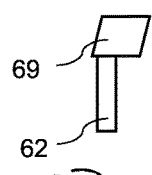 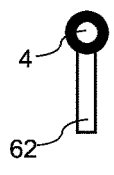 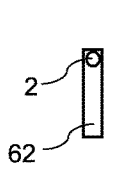 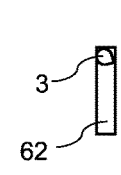  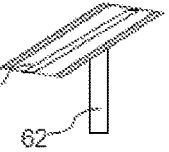
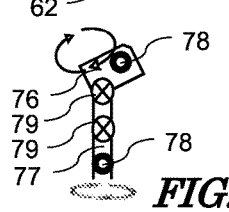
FIG. 9M
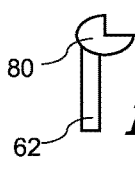
FIG. 9N
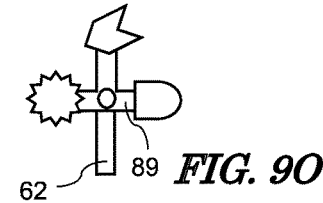
FIG. 9O

AUTONOMOUS LAWN MOWER BLADE SHARPENING AND TASK ROBOT

CROSS-REFERENCE TO RELATED APPLICATION

The present application claims priority to U.S. Provisional Patent Application No. 62/873,963, filed Jul. 14, 2019, the disclosure of which is entirely incorporated by reference herein.

FIELD OF THE INVENTION

The present invention relates to a novel manner in which to sharpen lawn mower blades. More particularly, the invention relates to mower blade sharpening and other tasks related to lawn mower blades, by means of an autonomous robot, while the lawn mower blades are still attached to the lawn mower.

BACKGROUND

Lawn mower blade sharpening has presented a challenge to a very large majority of lawn mower owners and operators. Typically, in order to sharpen a lawn mower blade, the owner/operator must complete several steps such as disconnecting the mower's battery, jacking up the mower, or turning it upside down, use safety gloves, use safety goggles, use safety blade locks, use tools to remove the blade, remove the blade, take the blade to an area for sharpening by means of a file, drill, vise, machinery, balancer, or more. When sharpening is complete, the owner/operator must balance the blade, and then the blade must be properly reinstalled onto the mower. This presents a significant danger, and problem to those with limited time, limited knowledge, limited strength, limited resources in tools, and more. If the owner/operator chooses not to conduct the sharpening themselves, they will have to take the time to remove the blade, and drive them to a location (not always convenient) where professionals sharpen the blades. This is a significant inconvenience, and time consuming.

It is, however, very important to keep lawn mower blades sharp at all times due to disease prevention of grass, savings of time due to lawn mower running more efficient, savings of money due to less cost in gas because the lawn mower is running more efficiently. These are the three main driving factors to keep lawn mower blades sharp.

Many sharpeners have been developed for the purposes of sharpening lawn mower blades, however, they are used for blades that have been removed from the lawn mower. Other sharpeners developed for use while the blades are attached to the mower are static hand devices that are used manually. These devices still create problems such as accuracy, effectiveness, danger of placing hands by the blades under the lawn mower, and more.

Therefore, a need exists in the field for an autonomous robot that sharpens lawn mower blades while the blades are attached to the lawn mower without compromising safety, and time. A further needs exists for an autonomous robot that not only sharpens lawn mower blades while attached to the mower, but also one that has the ability to clean, condition, repair, visualize, assess, change the blades, complete multiple tasks, and provide feedback to the owner regarding the lawn mower blades while the blades are still attached to the lawn mower, as well as addressing the underside of the lawn mower deck. Finally, there is also a need for the autonomous lawn mower blade sharpening robot to be able to detect lawn mowers, lawn mower blades, objects, obstacles, and understand/determine coverage patterns through various modes such as autonomous, programmed, owner-directed, device-directed, object recognition, spatial recognition, artificial intelligence and/or machine learning.

BRIEF SUMMARY OF THE INVENTION

The present invention comprises an autonomous lawn mower blade sharpening robot generally includes a base, at least one motor, at least one sensor, at least one camera, at least one wheel or track, at least one mode, at least one microprocessor, at least one light, at least one static or modular task element such as a sharpener, a power source, ability to complete at least one task at a time, and have the ability to be autonomous and/or communicate with a device.

According to one aspect of the present disclosure, an autonomous lawn mower blade sharpening and task robot configured to drive under at least one of a lawn mower and a lawn mower deck is provided. The robot includes at least one camera, at least one sensor, at least one task arm, and at least one task tip.

In one embodiment, the robot includes at least one means for object and spatial recognition.

In one embodiment, the at least one task tip is configured to sharpen at least one blade of the lawn mower.

In one embodiment, the at least one task tip is configured to clean at least one blade of the lawn mower.

In one embodiment, the at least one task tip is configured to condition at least one blade of the lawn mower.

In one embodiment, the robot further includes a body, at least one motor, and at least one microprocessor.

According to another aspect of the present disclosure, a method of servicing at least one lawn mower blade of at least one of a lawn mower and a lawn mower deck is disclosed. The method includes providing at least a lawn mower deck having at least one lawn mower blade coupled thereto. The method also includes providing a lawn mower blade sharpening and task robot, the robot including at least one camera, at least one sensor, at least one task arm, and at least one task tip. The method further includes positioning the lawn mower blade sharpening and task robot below the lawn mower deck. The method also includes positioning the at least one task tip relative to the at least one lawn mower blade so as to service the at least one lawn mower blade. The method further includes servicing the at least one lawn mower blade by way of the at least one task tip.

In one embodiment, servicing the at least one lawn mower blade includes sharpening at least one blade edge of the at least one lawn mower blade.

In one embodiment, servicing the at least one lawn mower blade includes cleaning the at least one lawn mower blade.

In one embodiment, servicing the at least one lawn mower blade includes conditioning the at least one lawn mower blade.

In one embodiment, the method includes removing the lawn mower blade sharpening and task robot from below the lawn mower deck when upon completion of the servicing of the at least one lawn mower blade.

Through at least one of camera(s) and/or sensor(s) and/or determined and/or predetermined and/or instructed and/or learned means, and/or programming, the robot may have the ability to guide itself and position itself under the lawn mower, specifically under the lawn mower deck where the blade(s) are located.

Through at least one of camera(s) and sensor(s) and/or determined and/or predetermined and/or instructed and/or learned means, and/or programming, the robot may have the ability to locate lawn mower blades, and the cutting edges on said mower blades. Once the robot is positioned at the lawn mower blade's cutting edge, through at least one of camera (s) and/or sensor(s) and/or task tools, the robot will perform the task it determines, that it is predetermined, that it is instructed, or that the robot already knows what to do through previous experiences and/or programming, at that blade's cutting edge. In preferred embodiments, the various tasks of the robot are each configured with a task tool that enables the robot to complete the determined, predetermined, instructed, programmed, or learned task relating to the blades' cutting edge(s). Once the task(s) is complete, through at least one of camera(s) and/or sensor(s) and/or determined and/or predetermined and/or instructed and/or learned and/or programmed means, the robot will exit from under the lawn mower deck and return to a determined spot. At this time, the robot is ready to complete its next task(s).

DETAILED DESCRIPTION OF THE DRAWINGS

Some embodiments of the present invention are depicted as illustration examples and are not limited to or by the figures or letters accompanying the drawings, and similar references may be indicative of similar components, and/or elements and in which:

FIG. 9A is a side perspective view of a task tip for use with an autonomous robot in accordance with an aspect of the present disclosure.

FIG. 9B is a side perspective view of a task tip for use with an autonomous robot in accordance with another aspect of the present disclosure.

FIG. 9C is a side perspective view of a task tip for use with an autonomous robot in accordance with another aspect of the present disclosure.

FIG. 9D is a side perspective view of a task tip for use with an autonomous robot in accordance with another aspect of the present disclosure.

FIG. 9E is a side perspective view of a task tip for use with an autonomous robot in accordance with another aspect of the present disclosure.

FIG. 9F is a side perspective view of a task tip for use with an autonomous robot in accordance with another aspect of the present disclosure.

FIG. 9G is a side perspective view of a task tip for use with an autonomous robot in accordance with another aspect of the present disclosure.

FIG. 9H is a side perspective view of a task tip for use with an autonomous robot in accordance with another aspect of the present disclosure.

FIG. 9I is a side perspective view of a task tip for use with an autonomous robot in accordance with another aspect of the present disclosure.

FIG. 9J is a side perspective view of a task tip for use with an autonomous robot in accordance with another aspect of the present disclosure.

FIG. 9K is a side perspective view of a task tip for use with an autonomous robot in accordance with another aspect of the present disclosure.

FIG. 9L is a side perspective view of a task tip for use with an autonomous robot in accordance with another aspect of the present disclosure.

FIG. 9M is a side perspective view of a task tip for use with an autonomous robot in accordance with another aspect of the present disclosure.

FIG. 9N is a side perspective view of a task tip for use with an autonomous robot in accordance with another aspect of the present disclosure.

FIG. 9O is a side perspective view of a task tip for use with an autonomous robot in accordance with another aspect of the present disclosure.

DETAILED DESCRIPTION OF THE INVENTION

Autonomous lawn mower blade task robot, apparatuses, and methods for sharpening, cleaning, conditioning, repairing, assessing, and visualizing lawn mower blade(s), and/or lawn mower blade(s) cutting edges while attached to the lawn mower are discussed herein.

The present disclosure pertains to a robot that is capable of being pushed, positioned, guided in any fashion, placed, autonomously positioned, manually positioned, slid, rolled, positioned by being static so that the lawn mower and/or lawn mower deck can be positioned on top of/nearby, controlled, aided in anyway, or by any other means positioned underneath and/or nearby any lawn mower and/or lawn mower deck.

The following disclosures discuss the invention, but are not limited to what is presented in the descriptions and/or drawings.

The present invention will now be detailed and detailed while referencing the attached drawings representing the preferred embodiments.

Figure 1A:
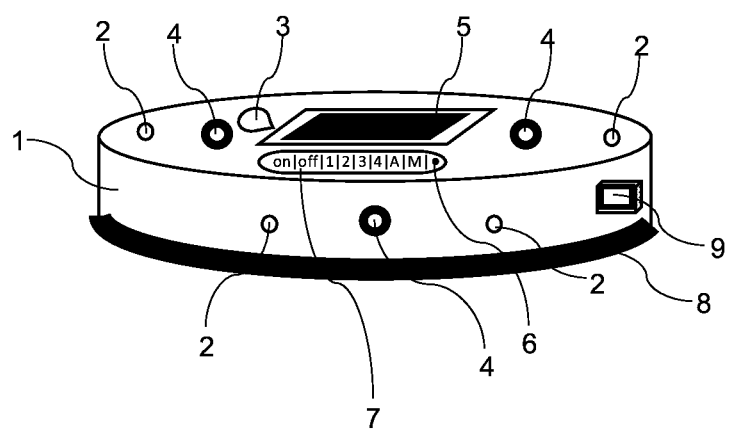
FIG. 1A is a side perspective view of an autonomous robot in accordance with an aspect of the present disclosure.
Figure 1B:
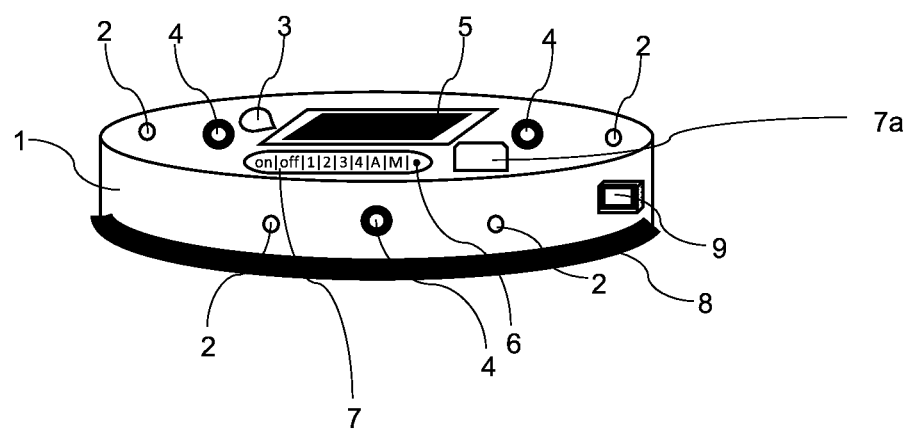
FIG. 1B is a side perspective view of the autonomous robot of FIG. 1A in accordance with another aspect of the present disclosure.
Figure 1C:
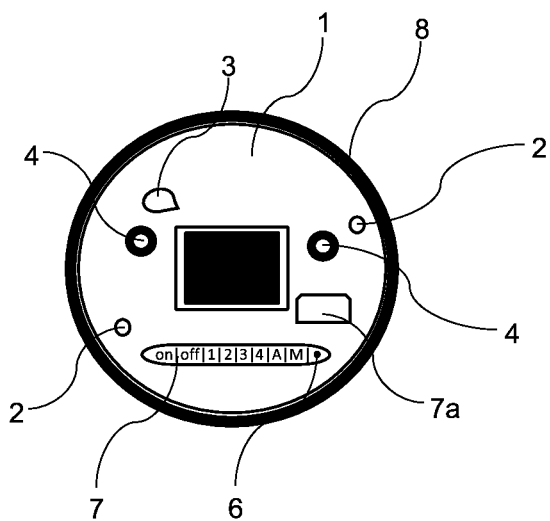
FIG. 1C is a top view of the autonomous robot of FIG. 1B.

FIGS. 1A-1C depict a robot body that contains its components which may or may not be round and/or square and/or oval and/or a geometric shape and/or any shape and/or any color and/or any material and/or any height and/or any width and/or any circumference. Specifically, referring to FIG. 1A, an autonomous robot 1 is shown as viewed in a normal state. Robot 1 may be formed by various shapes, sizes, colors, weights, heights, widths, and/or design. Robot 1 may include a sensor 2, and may further include a light/speaker 3 for the purposes of visualization, voice commands, and/or loud noise response. That is, if there is a loud noise, such as the lawn mower starting up or running, the robot 1 may be configured to autonomously drive away from the lawn mower. Robot 1 may further include a camera 4 for various purposes, including, but not limited to, optimal alignment of task arm(s) and/or task tip(s) for precision accuracy in task(s). A dome cover (not shown) may be provided on each camera(s) to prevent debris from covering up and/or blocking visualization and/or visibility.

Referring still to FIG. 1A, a base 5 provides a location for a task tool and/or solar panel, whether integrated into the robot 1 or replaceable, modular, and/or static. Base 5 provides a location for placement for the task tool and/or solar capabilities (i.e., one or more solar panels), as well as a depression in order to catch any falling debris, thereby providing for easy cleaning and less debris spread, as well as a location to store task tools and task tips not in use. An indicator 6, such as, e.g., an LED, is provided to indicate various possible features of the robot 1, such as, e.g., robot power, program(s), settings, task input, and/or mode. A panel 7 may include buttons, battery power, signal strength, dials, and/or other indications which will provide various options for programs, settings, on/off, LED, and/or user inputs for the purposes of the robot 1 completing a particular task.

Robot 1 may further include a duster and/or skirt 8 to move debris. That is, skirt 8 may simply push debris out of the path of the robot 1 in order to keep it from becoming caught, traveling under, or otherwise inhibiting the progress of the robot 1 in all direction. A power source input 9 may also be provided, with power source input 9 configured for use with one or more of power cables, USB cables, cable input sources, device receivers, remote receivers, external device receivers, and/or other cables to otherwise control or program the robot 1 externally, wirelessly, and/or controlled by an owner/user.

Next, FIGS. 1B and 1C depict an alternative configuration of robot 1 of FIG. 1A, wherein robot 1 includes a display 7a. Display 7a may be an LCD and/or other display component which may display items such as (but not limited to) messages from the robot's findings, the number of blade(s) sharpened, the number of task(s) completed, the next time for task(s) to be completed, the task(s) completed, suggestions from the robot, inputs from the owner, miscellaneous messages related to the robot, task(s), robot function(s), robot component(s), battery level(s), and/or any other messages related to the robot, tasks, owner-robot interactions, owner actions, etc. The robot 1 may utilize any or all of the camera(s) 4, sensor(s) 2, machine learning, object recognition, spatial recognition, learned behavior, preprogramming, tactile feel, computer programming, microprocessor, and/or owner-robot device interactions in determining what information is displayed on display 7*a*.

Figure 2:
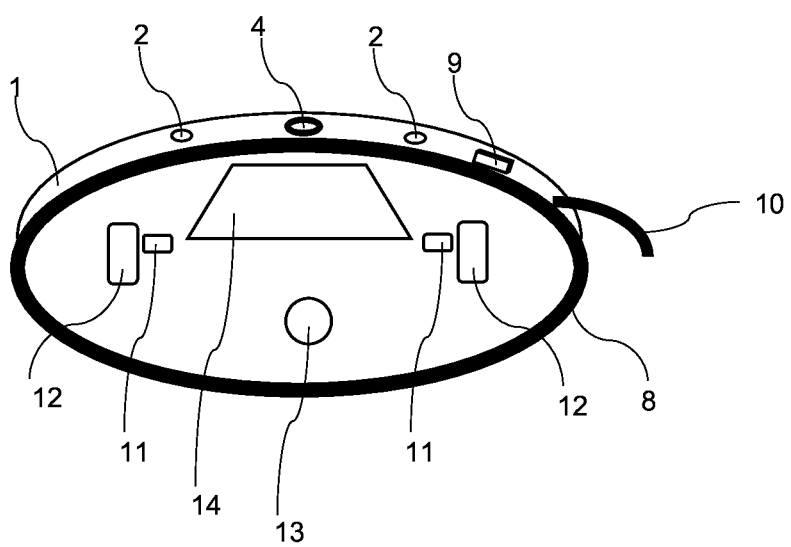
FIG. 2 is a bottom perspective view of the autonomous robot of FIGS. 1A-1C.

FIG. 2 depicts the underside of the robot 1 as shown and described with respect to FIGS. 1A-1C. A cable 10 may be provided, wherein cable 10 may be any suitable external cable, hard wire, and/or cord that is attached to the robot 1 for the purposes of program, settings, control, and/or power. A brake/actuator 11 may be provided for the purposes of steering, stopping, elevating, descending, locking into place, pivoting, anti-vibration, counter-balance, robot movement, and/or task involvement. Right and left wheel(s) 12 are provided for the purposes of moving the robot in any direction at a speed controlled by programming, device, owner, and/or settings. Alternatively, one or more tracks may be utilized in lieu of, or in addition to, the right and left wheel(s) 12. A third wheel 13 may be provided to assist in the steering and mobile refinement for lining up the robot 1 for tasks in an accurate fashion and/or general motion purposes. Alternatively, a ball or track may be used in place of third wheel 13. A reservoir 14 may be provided for the containment of fluid, water, cleaner, conditioner, dissolvent, silicone, 3-D printing material, additive material, blade(s) repairing material, and/or other materials. Additionally, the underside of robot 1 may include a space in which to conduct maintenance of robot, maintenance of task arm element(s), exchanging task element(s), and/or access the inner parts of the robot including but not limited to the motor(s) and/or counter-balance mechanism(s) and/or anti-vibration mechanism(s).

Figure 3A:
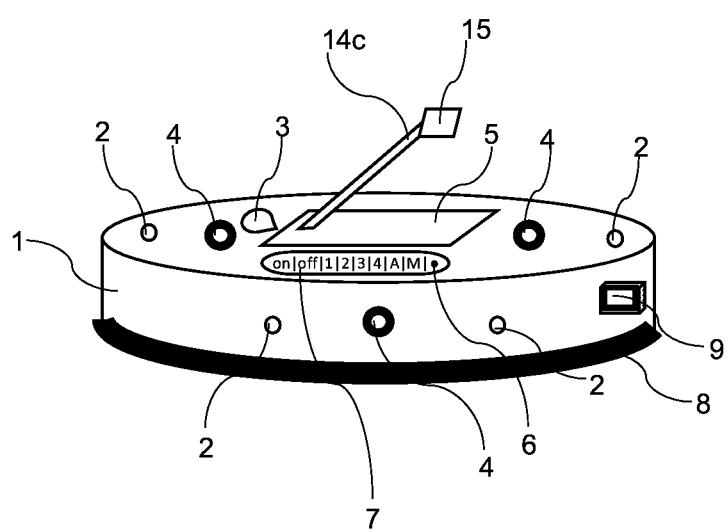
FIG. 3A is a side perspective view of an autonomous robot having a static task arm in accordance with another aspect of the present disclosure.
Figure 3B:
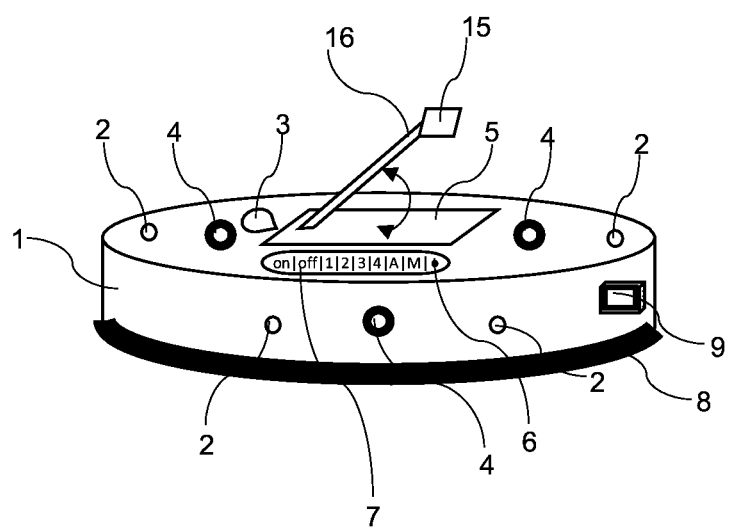
FIG. 3B is a side perspective view of an autonomous robot having a mobile task arm in accordance with another aspect of the present disclosure.
Figure 3C:
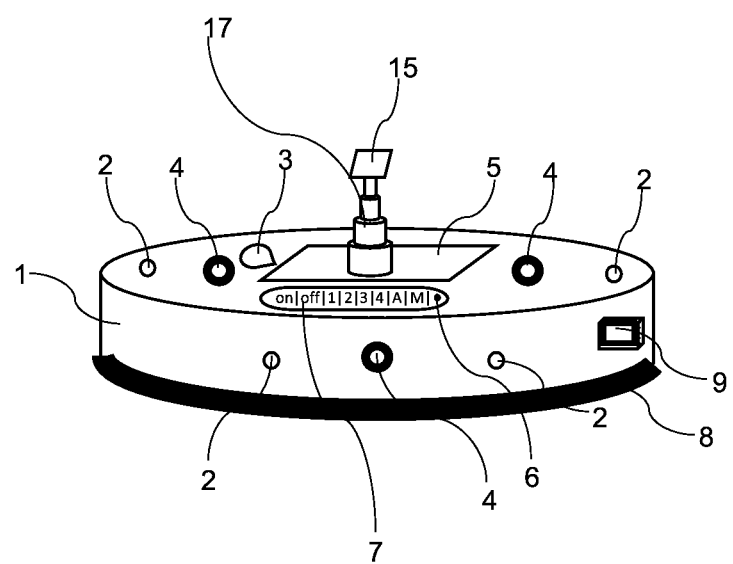
FIG. 3C is a side perspective view of an autonomous robot having a telescoping task arm in accordance with another aspect of the present disclosure.
Figure 3D:
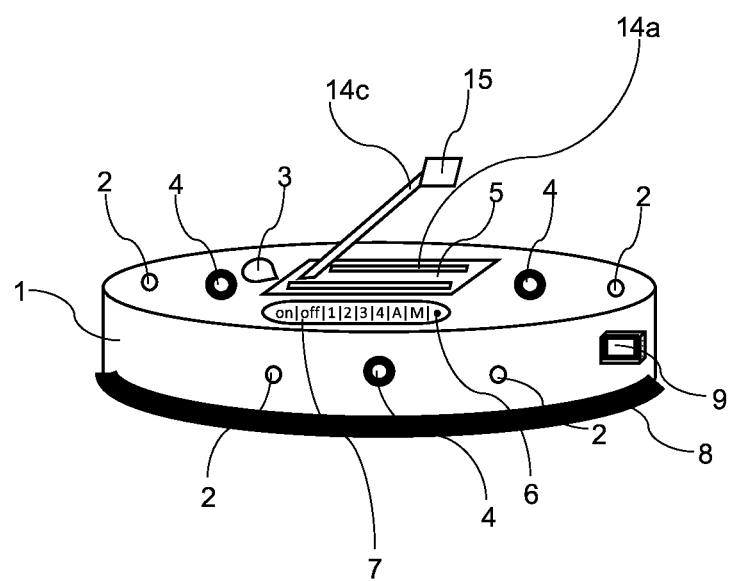
FIG. 3D is a side perspective view of an autonomous robot having multiple task arms in accordance with another aspect of the present disclosure.
Figure 3E:
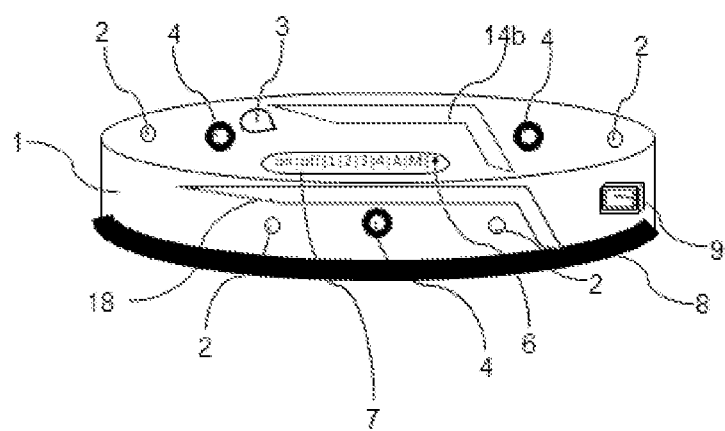
FIG. 3E is a side perspective view of an autonomous robot having L-shaped task arms in accordance with another aspect of the present disclosure.
Figure 3F:
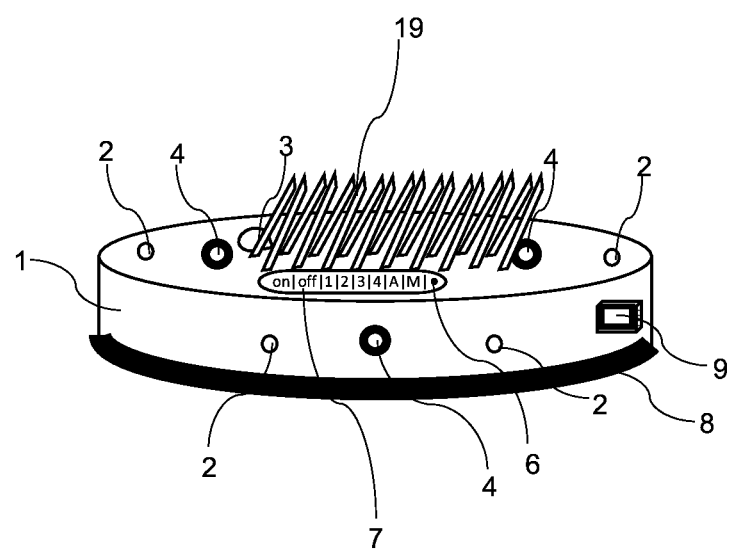
FIG. 3F is a side perspective view of an autonomous robot having integrated task tools in accordance with another aspect of the present disclosure.
Figure 3G:
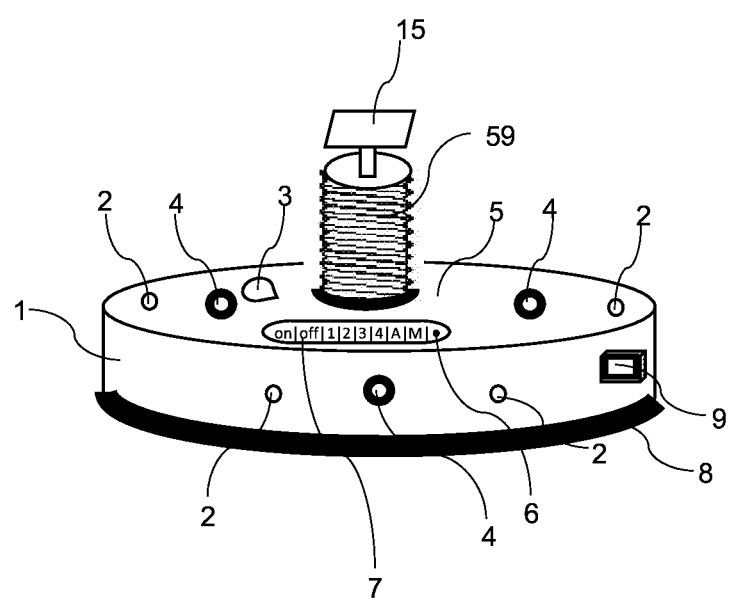
FIG. 3G is a side perspective view of an autonomous robot having one or more screw or spiral-shaped task arms in accordance with another aspect of the present disclosure.
Figure 3H:
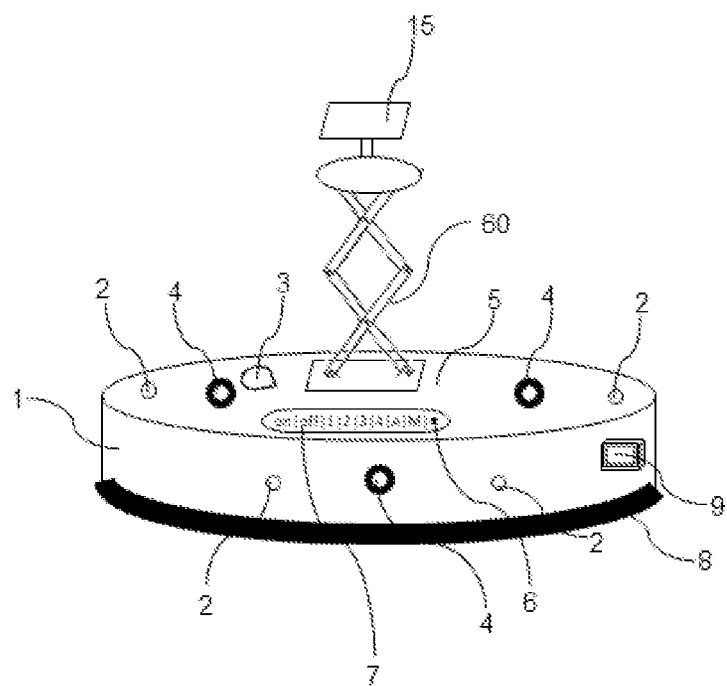
FIG. 3H is a side perspective view of an autonomous robot having one or more scissoring task arms in accordance with another aspect of the present disclosure.
Figure 3I:
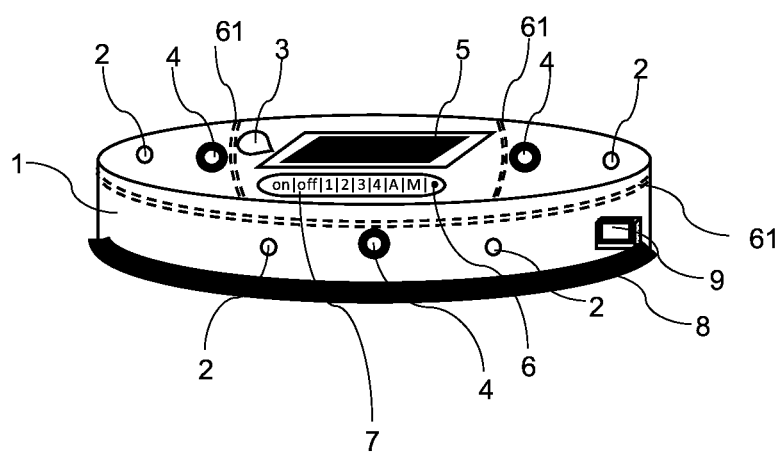
FIG. 3I is a side perspective view of an autonomous robot having a clamshell structure in accordance with another aspect of the present disclosure.
Figure 3J:
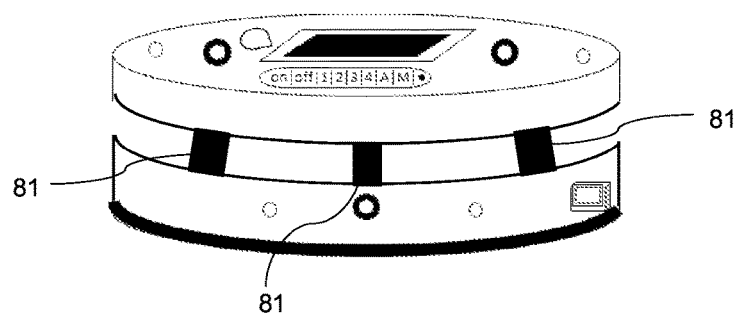
FIG. 3J is a side perspective view of an autonomous robot capable of raising and/or lowering by way of posts in accordance with another aspect of the present disclosure.
Figure 3K:
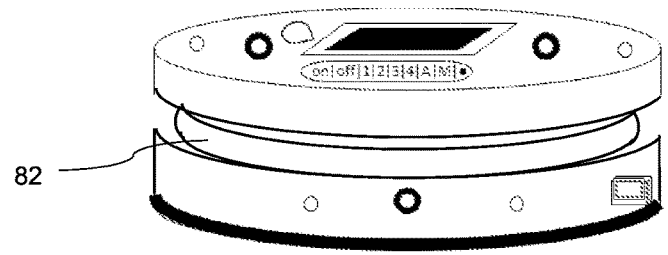
FIG. 3K is a side perspective view of an autonomous robot capable of raising and/or lowering by way of a bladder in accordance with another aspect of the present disclosure.
Figure 3L:
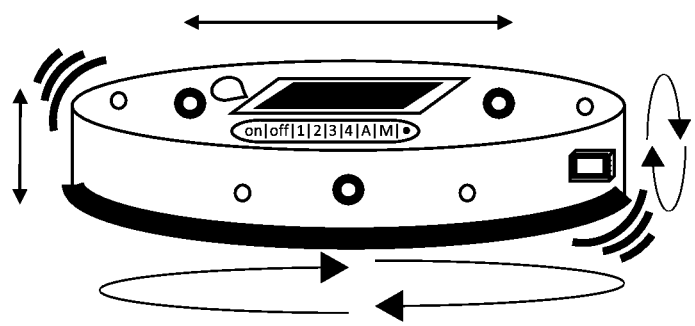
FIG. 3L is a side perspective view depicting possible motion(s) and/or movement(s) of an autonomous robot in accordance with an aspect of the present disclosure.
Figure 3M:
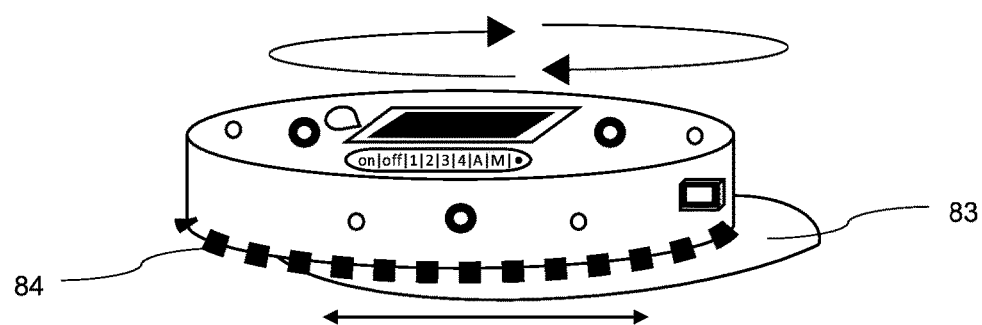
FIG. 3M is a side perspective view depicting possible motion(s) and/or movement(s) of an autonomous robot on a track and/or pad in accordance with another aspect of the present disclosure.
Figure 3N:
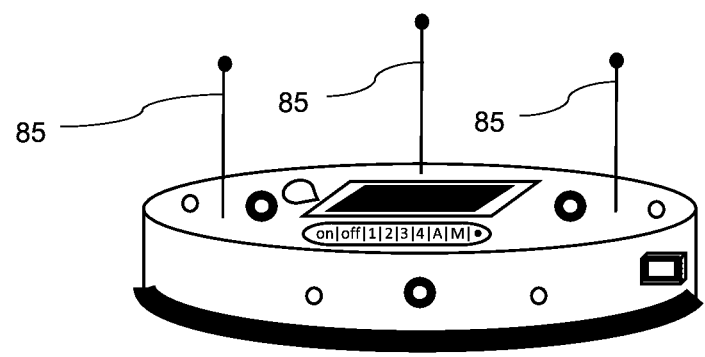
FIG. 3N is a side perspective view of an autonomous robot having one or more tactile antenna(s) in accordance with another aspect of the present disclosure.

Next, referring to FIGS. 3A-3N, task arm and related arrangements for robot 1 in accordance with various embodiments of the present disclosure are shown.

Referring to FIG. 3A, in accordance with an embodiment of the disclosure, robot 1 is shown with a static task arm. A task tip location 15 is provided, wherein a specific task tip may be integrated into a task arm 14*c*, replaceable from the task arm 14*c*, and/or removable from the task arm 14*c*, modular in relation to the task arm 14*c*. Task tip location 15 may be configured to accommodate multiple different and/or similar task tips as a single tip and/or multiple tips at the same time and/or in conjunction with each other. Base 5, task arm 14*c*, and task tip location 15 make up the task element. Accordingly, when base 5, task arm 14*c*, and task tip location 15 are mentioned herein, either together or separate, they are to be considered interchangeable and can be interpreted to mean the embodiment of the task element and all features related to task(s) and task(s) operations and/or functions.

FIG. 3B depicts another embodiment of the present disclosure, wherein robot 1 includes a mobile task arm 16. Mobile task arm 16 may include springs and/or tether(s), and may have one or more rotation parts and/or joints. Mobile task arm 16 may be configured to articulate, raise, lower, spin, start and/or stop at any height, elevate, descend, be spring-loaded, be controlled by a user, be controlled by one or more sensors, be controlled by one or more cameras, be controlled by software, be controlled by programming, be controlled by artificial intelligence, be controlled by machine learning, and/or be controlled by an internal and/or external device. Additionally and/or alternatively, mobile task arm 16 may have electronics embedded therein or thereabout, and mobile task arm 16 may be configured and move in any direction or only specific direction(s). Accordingly, mobile task arm 16 may provide a "boom action".

Referring now to FIG. 3C, an embodiment of robot 1 is illustrated as including a mobile telescoping task arm 17. Mobile telescoping task arm 16 may have one or more layers, levels, rotation parts and/or joints. Mobile telescoping task arm 16 may be configured to articulate, raise, lower, spin, start and/or stop at any height, elevate, descend, be spring-loaded, be controlled by a user, be controlled by one or more sensors, be controlled by one or more cameras, be controlled by software, be controlled by programming, be controlled by artificial intelligence, be controlled by machine learning, and/or be controlled by an internal and/or external device. Additionally and/or alternatively, mobile telescoping task arm 17 may have electronics embedded therein or thereabout, and mobile telescoping task arm 17 may be configured and move in any direction or only specific direction(s).

FIG. 3D depicts an embodiment of robot 1 having multiple mobile task arms 14*a*, 14*c*. The multiple mobile task arms 14*a*, 14*c* may have one or more rotation parts and/or joints. The multiple mobile task arms 14*a*, 14*c* may be configured to articulate, raise, lower, spin, start and/or stop at any height, elevate, descend, be spring-loaded, be controlled by a user, be controlled by one or more sensors, be controlled by one or more cameras, be controlled by software, be controlled by programming, be controlled by artificial intelligence, be controlled by machine learning, and/or be controlled by an internal and/or external device. Additionally and/or alternatively, multiple mobile task arm 14*a*, 14*c* may have electronics embedded therein or thereabout, and multiple mobile task arm 14*a*, 14*c* may be configured and move in any direction or only specific direction(s). Furthermore, while only two mobile task arms 14*a*, 14*c* are shown in FIG. 3D, it is to be understood that more or fewer mobile task arms may be utilized.

FIG. 3E shows an embodiment of robot 1 having L-shaped (or otherwise geometrically shaped) task arms 14*b*. The L-shaped task arms 14*b* may be located on the top and/or on the bottom of the robot 1, wherein the L-shaped task arms 14*b* may have one or more rotation parts and/or joints, that can articulate, retract, raise, lower, spin, start and/or stop at any height, elevate, descend, be controlled by owner, be controlled by sensor(s), be controlled by camera(s), be controlled by software, be controlled by programming, be controlled by artificial intelligence, be controlled by machine learning, and/or be controlled by an internal and/or external device. Additionally and/or alternatively, the L-shaped task arms 14*b* may include electronics embedded in and/or around the arm, and may be configured and move in any direction or only specific direction(s). Furthermore, one or more additional L-shaped task arms 18 may be provided on a side of the robot 1. As with L-shaped task arms 14*b*, the additional L-shaped task arm(s) 18 may have one or more rotation parts and/or joints, that can articulate, retract, raise, lower, spin, start and/or stop at any height, elevate, descend, be controlled by owner, be controlled by sensor(s), be controlled by camera(s), be controlled by software, be controlled by programming, be controlled by artificial intelligence, be controlled by machine learning, and/or be controlled by an internal and/or external device. Additionally and/or alternatively, the additional L-shaped task arms 18 may include electronics embedded in and/or around the arm, and may be configured and move in any direction or only specific direction(s).

Referring to FIG. 3F, another alternative embodiment of robot 1 includes integrated task arms and/or task tips and/or task bristles that have the ability to spin, oscillate, gyrate, agitate, and/or otherwise move in a fashion to complete a task. In such a way, the body of robot becomes and/or is the task element. Multiple integrated task tools 19 are provided that may have one or more rotation parts and/or joints that can articulate, elevate, retract, descend, be controlled by owner, be controlled by sensor(s), be controlled by camera(s), be controlled by software, be controlled by programming, be controlled by artificial intelligence, be controlled by machine learning, and/or be controlled by an internal and/or external device. Additionally and/or alternatively, the integrated task tools 19 may include electronics embedded therein, and may be configured and move in any direction or only specific direction(s). The integrated task tools 19 may be formed of bristles, brushes, and/or other task tip designs, and/or materials.

FIG. 3G illustrates another embodiment, wherein robot 1 includes one or more corkscrew and/or screw and/or spiral task arms and/or task tips. The one or more corkscrew/screw task tool(s) 59 may include threads, rivets, shims, channels, male/female interface, and/or gears. The corkscrew/screw task tool(s) 59 may have one or more rotation parts and/or joints that can articulate, elevate, retract, descend, be controlled by owner, be controlled by sensor(s), be controlled by camera(s), be controlled by software, be controlled by programming, be controlled by artificial intelligence, be controlled by machine learning, and/or be controlled by an internal and/or external device. Additionally and/or alternatively, the corkscrew/screw task tool(s) 59 may include electronics embedded therein, and may be configured and move in any direction or only specific direction(s).

Next, referring to FIG. 3H, robot 1 in accordance with another embodiment is shown, wherein one or more scissor task arm(s) and/or task tool(s) 60 are provided. The one or more scissor task tool(s) and/or arm(s) 60 may include a series of rods and/or screws, and/or rivets, threads, shims, channels, male/female interface, and/or gears. The one or more scissor task tool(s) and/or arm(s) 60 may have one or more rotation parts and/or joints that can articulate, elevate, retract, descend, spin, stop, start, be controlled by owner, be controlled by sensor(s), be controlled by camera(s), be controlled by software, be controlled by programming, be controlled by artificial intelligence, be controlled by machine learning, and/or be controlled by an internal and/or external device. Additionally and/or alternatively, the one or more scissor task tool(s) and/or arm(s) 60 may include electronics embedded therein, and may be configured and move in any direction or only specific direction(s).

FIG. 3I shows an embodiment of robot 1 having a clamshell configuration. Clamshell breaks 61 are illustrated in FIG. 3I. Clamshell breaks 61 may be located on the top, side(s), and/or bottom of the robot 1, and there may be one or more breaks throughout the robot 1. The purpose for the clamshell break(s) 61 is to allow for the robot 1 to expand, contract, retract, raise, lower, in multiple planes at the same time and/or different times and/or steps as determined by the ability of the robot to be controlled by owner, be controlled by sensor(s), be controlled by camera(s), be controlled by software, be controlled by programming, be controlled by artificial intelligence, be controlled by machine learning, and/or be controlled by an internal and/or external device. The robot 1 having clamshell breaks 61 may have electronics embedded therein and/or thereabout, and may be configured to move in all and/or specific directions through at least one of camera(s) 4, sensor(s) 2, machine learning, object recognition, spatial recognition, learned behavior, preprogramming, tactile feel, computer programming, microprocessor, and/or owner device direction.

Referring to FIG. 3J, an embodiment of robot 1 in which the robot 1 is capable of being able to expand and/or raise and/or lower on rods and/or posts 81 is shown. The movement about rods and/or posts 81 can be achieved through at least one of camera(s) 4, sensor(s) 2, machine learning, object recognition, spatial recognition, learned behavior, preprogramming, tactile feel, computer programming, microprocessor, and/or owner device direction. Alternatively, movement about rods and/or posts 81 may be done manually by the user.

FIG. 3K pertains to an embodiment of robot 1 wherein robot 1 is able to expand and/or raise and/or lower on a bladder 82, wherein bladder 82 may be configured to contain at least one of air, fluid, and/or other material. The movement about bladder 82 can be achieved through at least one of camera(s) 4, sensor(s) 2, machine learning, object recognition, spatial recognition, learned behavior, preprogramming, tactile feel, computer programming, microprocessor, and/or owner device direction. Alternatively, movement about bladder 82 may be done manually by the user.

FIG. 3L depicts motion(s) and/or movement(s) that a robot 1 in accordance with an embodiment of the disclosure may be capable of achieving. Such movements may be (but are not limited to) rotating, circulating, spinning, gyrating, agitating, side-to-side, back-and-forth, shaking, vibrating, bumping, elevating, lowering, flipping, and/or oscillating through at least one of camera(s) 4, sensor(s) 2, machine learning, object recognition, spatial recognition, learned behavior, preprogramming, tactile feel, computer programming, microprocessor, and/or owner device direction. Alternatively, such movement may be done manually by the user.

Referring to FIG. 3M, an embodiment in which motion(s) and/or movement(s) that the robot 1 may be capable of achieving on a track/pad 83 and/or on itself 84 are illustrated. Such motion(s) and/or movement(s) include, but not limited to, rotating, circulating, spinning, gyrating, agitating, side-to-side, back-and-forth, shaking, vibrating, bumping, elevating, lowering, flipping, and/or oscillating through at least one of camera(s) 4, sensor(s) 2, machine learning, object recognition, spatial recognition, learned behavior, preprogramming, tactile feel, computer programming, microprocessor, and/or owner device direction. Alternatively, such movement may be done manually by the user.

FIG. 3N depicts a robot with one and/or more tactile antenna(s) (85), feelers and/or finders that can be connected and/or controlled and/or given feedback and/or provide messaging and/or other assist the robot in decision-making and/or task(s) component(s) through at least one of camera(s) (4), sensor(s) (2), machine learning (ML), object recognition (OR), spatial recognition (SR), learned behavior, preprogramming, tactile feel (85), computer programming, microprocessor, and/or owner device direction and/or manually.

Figure 4:
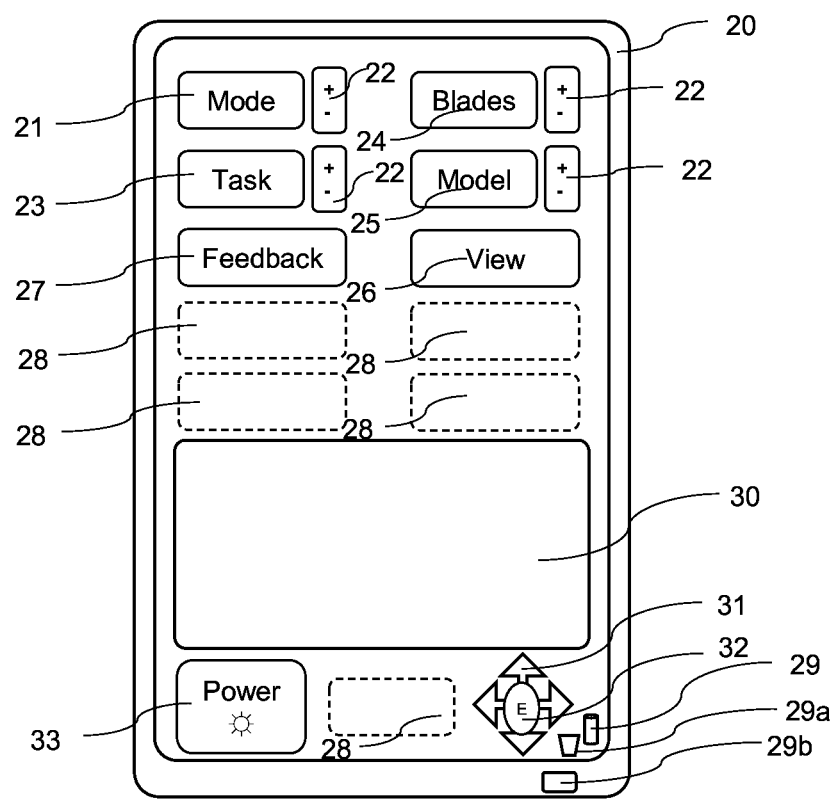
FIG. 4 is a top view of a remote device or other graphical user interface device used for control of an autonomous robot in accordance with an aspect of the present disclosure.

Next, referring to FIG. 4, a remote or other graphical user interface device 20 for selective control of a robot in accordance with aspects of the present disclosure is shown. The remote 20 includes a Mode button 21 and a selector button 22. A Task button 23 is also included for the purposes of choosing and/or designating a task and/or see which task(s) have been completed in the past, and/or which task(s) need to be completed in the future, and/or scheduling task(s), and/or viewing schedule of task(s) and/or seeing which task is currently being completed, which will be controlled by owner, sensor(s), camera(s), software, programming, artificial intelligence, machine learning, an internal and/or external device, etc.

A Blades button 24 may be provided for purposes of choosing the number of blades, model of blades, and/or all things related to the blades of the lawn mower. A Model button 25 may be provided for purposes of choosing the model of the lawn mower, make of the lawn mower, and/or all things related to the lawn mower. A View button 26 may be provided for purposes of accessing the camera for live views, picture views, and/or any type of view a camera(s) and/or sensor(s) can provide. A Feedback button 27 may be provided for purposes of viewing feedback given to owner via camera(s), sensor(s), by programming, by artificial intelligence, by machine learning, by algorithm, by object recognition, by spatial recognition, by tactile sensory of task arm(s), task tool(s), task element(s), and/or task tool tip(s).

Referring still to FIG. 4, empty slots and/or spaces 28 may be provided for scalability in what information to provide owner relating to the robot in the future. A power level indicator 29 may be provided, while a signal strength indicator 29a may also be provided. A power source input 29b may be provided for power cables, USB cables, cable input source, device receiver, remote receiver, external device receiver, and/or other cables to otherwise control or program the robot externally, wirelessly, and/or controlled by an owner. A screen 30 may be provided to enable the user to choose the desired view pertaining to the robot. The remote 20 may further include a directional selector 31, an enter button 32 to choose a selection, and a power on/off button 33.

Figure 5:
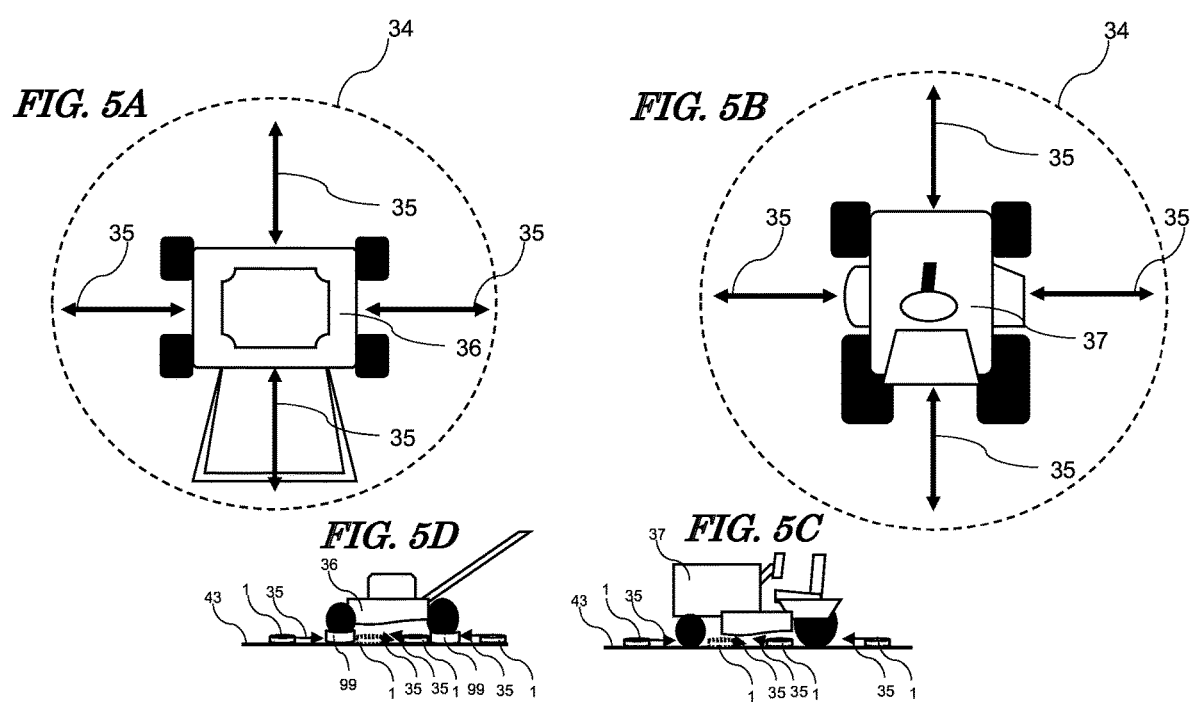
FIG. 5A is an overhead view of the direction, means, location, and/or path that an autonomous robot may enter and/or exit under a push and/or walk behind lawn mower in accordance with an aspect of the present disclosure.
FIG. 5B is an overhead view of the direction, means, location, and/or path that an autonomous robot may enter and/or exit under a riding and/or ride on lawn mower in accordance with an aspect of the present disclosure.
FIG. 5C is a side view of the direction, means, location, and/or path that the autonomous robot may enter and/or exit under a riding and/or ride on lawn mower as shown in FIG. 5B.
FIG. 5D is a side view of the direction, means, location, and/or path that the autonomous robot may enter and/or exit under a push and/or walk behind lawn mower as shown in FIG. 5A.

Next, referring to FIG. 5A, an overhead view of the direction, means, location, and/or path that a robot may enter and/or exit under a push/walk behind lawn mower in accordance with an aspect of the present disclosure is shown. Such movement of the robot may be performed autonomously, be scheduled, by the ability of the robot to be controlled by owner, be controlled by sensor(s), be controlled by camera(s), be controlled by software, be controlled by programming, be controlled by artificial intelligence, be controlled by machine learning, be controlled by object recognition, be controlled by spatial recognition, be controlled wirelessly, be controller by the robot's microprocessor, be controlled by the robot's motherboard, or be controlled by an internal and/or external device. A radius 34 may be provided, wherein the robot may follow the radius 34 in order to find the appropriate entry point given the task and/or programming of the robot's movements. Possible entry/exit points 35 are also provided for entry and/or exit of the robot from below the push/walk behind lawn mower and deck 36.

Similarly, referring to FIG. 5B, an overhead view of the direction, means, location, and/or path that a robot may enter and/or exit under a ride-on lawn mower in accordance with another aspect of the present disclosure is shown. Such movement of the robot may be performed autonomously, be scheduled, by the ability of the robot to be controlled by owner, be controlled by sensor(s), be controlled by camera(s), be controlled by software, be controlled by programming, be controlled by artificial intelligence, be controlled by machine learning, be controlled by object recognition, be controlled by spatial recognition, be controlled wirelessly, be controller by the robot's microprocessor, be controlled by the robot's motherboard, or be controlled by an internal and/or external device. A radius 34 may be provided, wherein the robot may follow the radius 34 in order to find the appropriate entry point given the task and/or programming of the robot's movements. Possible entry/exit points 35 are also provided for entry and/or exit of the robot from below the ride-on mower and deck 37.

FIG. 5C depicts a side view of the direction, means, location, and/or path that the robot may enter and/or exit under the ride-on lawn mower as shown in FIG. 5B. Again, possible entry/exit points 35 of the robot 1 from beneath the ride-on lawn mower and deck 37 with respect to the ground 43 are shown. Similarly, FIG. 5D depicts a side view of the direction, means, location, and/or path that the robot may enter and/or exit under the push/walk-behind lawn mower as shown in FIG. 5A. Possible entry/exit points 35 of the robot 1 from beneath the push/walk-behind lawn mower and deck 36 with respect to the ground 43 are shown. Additionally, in some embodiments, jacks 99 may be provided so as to lift a lawn mower that may be too low for the robot 1 to go under. Alternatively, the jacks 99 may be formed by pillars, platforms, ramps, lifts, etc.

Figure 6:
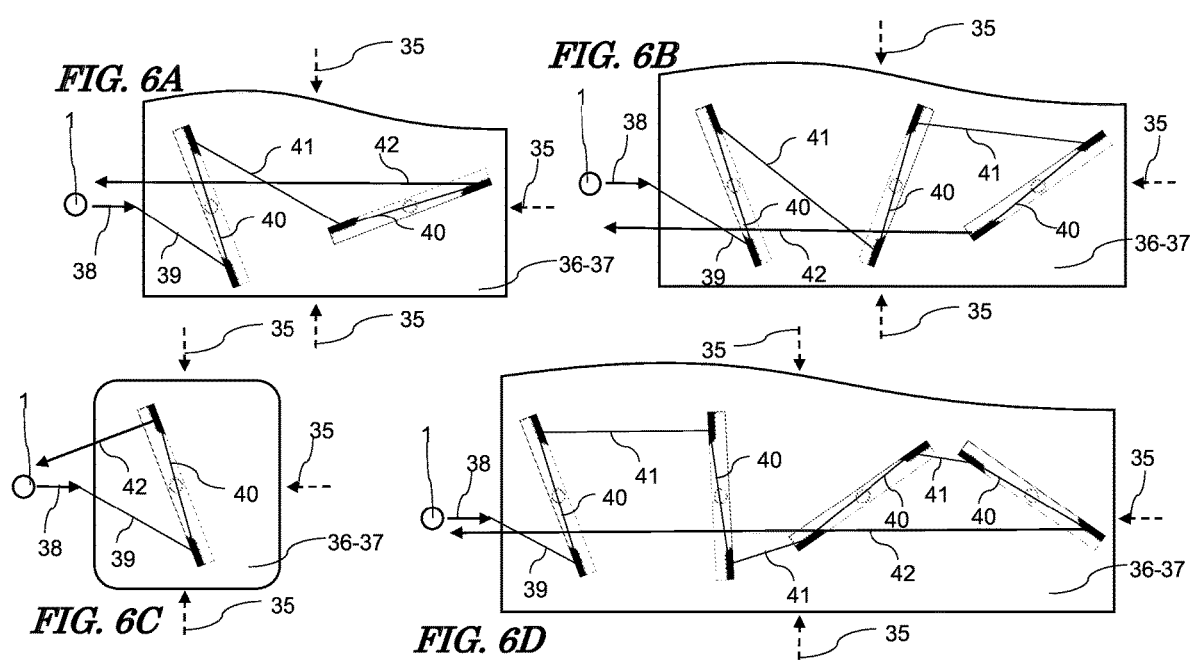
FIG. 6A is a schematic view of how an autonomous robot may enter and/or exit under a two-blade lawn mower and/or the lawn mower deck in accordance with an aspect of the present disclosure.
FIG. 6B is a schematic view of how an autonomous robot may enter and/or exit under a three-blade lawn mower and/or the lawn mower deck in accordance with an aspect of the present disclosure.
FIG. 6C is a schematic view of how an autonomous robot may enter and/or exit under a one-blade lawn mower and/or the lawn mower deck in accordance with an aspect of the present disclosure.
FIG. 6D is a schematic view of how an autonomous robot may enter and/or exit under a four-blade lawn mower and/or the lawn mower deck in accordance with an aspect of the present disclosure.

Referring now to FIGS. 6A-6D, various configurations for how a robot in accordance with embodiments of the present disclosure may enter/exit below a mower and mower deck are shown. Specifically, FIG. 6A illustrates one possible configuration as to how the robot 1 may enter and/or exit under a two-blade lawn mower and/or the lawn mower deck to complete a task beneath a push/walk-behind lawn mower 36 or ride-on mower 37. Movement of the robot 1 may be done autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device in order to complete its assigned, and/or determined task(s) for lawn mower with one or more lawn mower blades and or lawn mower blade cutting edges for the purposes and/or goals of efficiency, and/or effectiveness. A path 38 upon which the robot 1 travels under the lawn mower and/or lawn mower deck is shown. A first blade path 39 is provided to address the first blade and/or the cutting edge, while a second blade path 40 is provided to address the second edge of a blade. Next, a third blade path 41 is provided to send the robot 1 from one blade to the next, with the robot 1 again travelling along the second blade path 40 with respect to the next blade so as to complete the task associated with that blade. The robot 1 may then travel upon a final path 42 after the task(s) is completed.

FIG. 6B illustrates a similar configuration as that described above with respect to FIG. 6A, but illustrates one example of how robot 1 may enter and/or exit under a three-blade lawn mower and/or the lawn mower deck to complete a task beneath a push/walk-behind lawn mower 36 or ride-on mower 37. Movement of the robot 1 may be done autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device in order to complete its assigned, and/or determined task(s) for lawn mower with one or more lawn mower blades and or lawn mower blade cutting edges for the purposes and/or goals of efficiency, and/or effectiveness. A path 38 upon which the robot 1 travels under the lawn mower and/or lawn mower deck is shown. A first blade path 39 is provided to address the first blade and/or the cutting edge, while a second blade path 40 is provided to address the second edge of a blade. Next, a third blade path 41 is provided to send the robot 1 from one blade to the next, with the robot 1 again travelling along the second blade path 40 with respect to the next blade so as to complete the task associated with that blade. Then, the blade path 41 may be travelled again, only this time delivering the robot 1 from the second blade to the third blade. After the robot 1 completes the tasks associated with the third blade, the robot 1 may then travel upon a final path 42 after the task(s) is completed, exiting from below the lawn mower and/or lawn mower deck.

Referring now to FIG. 6C, one possible configuration as to how the robot 1 may enter and/or exit under a single-blade lawn mower and/or the lawn mower deck to complete a task beneath a push/walk-behind lawn mower 36 or ride-on mower 37 is shown. Movement of the robot 1 may be done autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device in order to complete its assigned, and/or determined task(s) for lawn mower with one or more lawn mower blades and or lawn mower blade cutting edges for the purposes and/or goals of efficiency, and/or effectiveness. A path 38 upon which the robot 1 travels under the lawn mower and/or lawn mower deck is shown. A first blade path 39 is provided to address the blade and/or the cutting edge, while a second blade path 40 is provided to address the second edge of the blade. Then, the robot 1 may travel upon a final path 42 after the task(s) is completed.

Finally, referring to FIG. 6D, one example of how robot 1 may enter and/or exit under a four-blade lawn mower and/or the lawn mower deck to complete a task beneath a push/walk-behind lawn mower 36 or ride-on mower 37. Movement of the robot 1 may be done autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device in order to complete its assigned, and/or determined task(s) for lawn mower with one or more lawn mower blades and or lawn mower blade cutting edges for the purposes and/or goals of efficiency, and/or effectiveness. A path 38 upon which the robot 1 travels under the lawn mower and/or lawn mower deck is shown. A first blade path 39 is provided to address the first blade and/or the cutting edge, while a second blade path 40 is provided to address the second edge of a blade. Next, a third blade path 41 is provided to send the robot 1 from one blade to the next, with the robot 1 again travelling along the second blade path 40 with respect to the next blade so as to complete the task associated with that blade. Then, the blade path 41 may be travelled again, only this time delivering the robot 1 from the second blade to the third blade. After the robot 1 completes the tasks associated with the third blade, the robot 1 may then travel upon the blade path 41 to the fourth blade, similarly completing the tasks associated with the fourth blade. Finally, when the tasks associated with the fourth blade are completed, a final path 42 is travelled, allowing the robot 1 to exit from below the lawn mower and/or lawn mower deck.

Figure 7:
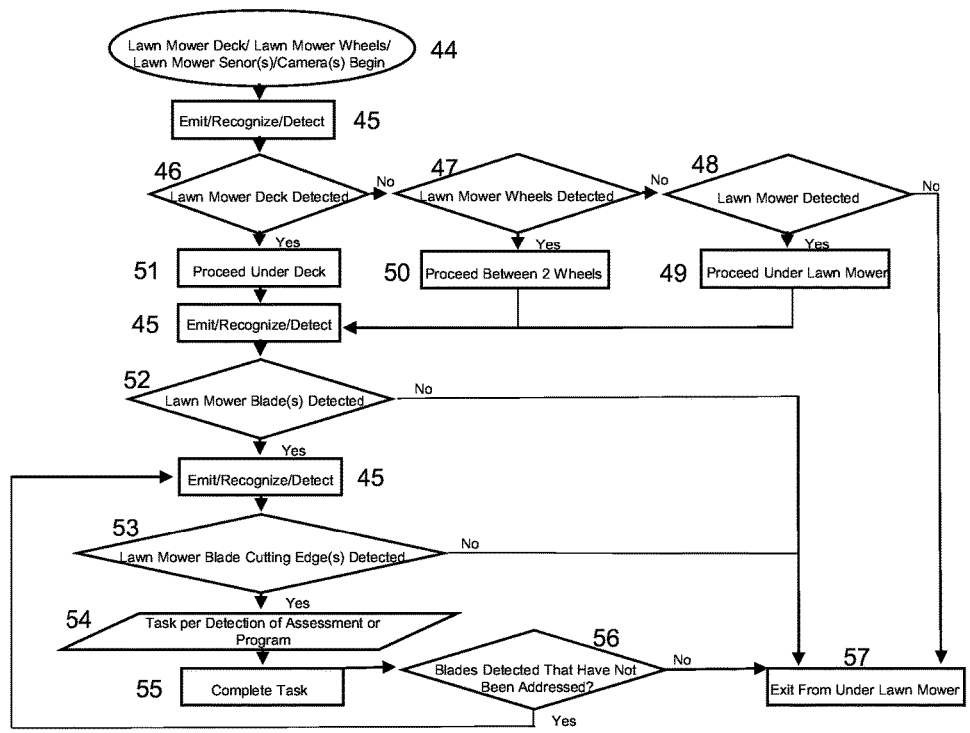
FIG. 7 is a flow chart depicting a process of an autonomous robot in accordance with an aspect of the present disclosure.

Referring now to FIG. 7, a flow chart of robot process, coverage, decision making and/or mobility according to an aspect of the present disclosure is shown. At 44, the robot begins its task process, whether that is done autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device in order to complete its assigned, and/or determined task(s) for lawn mower with one or more lawn mower blades and or lawn mower blade cutting edges for the purposes and/or goals of efficiency, and/or effectiveness. Then, at 45, the sensor(s) and/or camera(s) work to find what they are programmed to detect. At 46, it is determined whether or not a lawn mower deck has been detected. If lawn mower deck has not been detected, then, at 47, it is determined whether or not lawn mower wheels been detected. If lawn mower wheels have not been detected, then, at 48, it is determined whether or not a lawn mower been detected. If a lawn mower has been detected, the robot proceeds under the lawn mower at 49. If lawn mower wheels have been detected, the robot proceeds between two wheels at 50. Alternatively, if lawn mower deck has been detected, the robot proceeds under lawn mower deck at 51.

At 52, it is determine whether or not lawn mower blade(s) have been detected. If lawn mower blades have not been detected, the robot exits from under the mower and returns to beginning point at 57. If, however, the lawn mower blades have been detected, it is determined if the lawn mower blade cutting edges are detected at 53. If no, the robot exits from under the mower and returns to beginning point at 57. If yes, the robot conducts and/or completes the task at 54, either autonomously, scheduled, by the ability of the robot to be controlled by owner, controlled by sensor(s), controlled by camera(s), controlled by software, controlled by programming, controlled by artificial intelligence, controlled by machine learning, controlled by object recognition, controlled by spatial recognition, controlled wirelessly, pattern controlled by a programmed mat, controller by the robot's microprocessor, controlled by the robot's motherboard, controlled by an internal and/or external device.

Next, at 55, a determination is made by the robot when the task(s) have been complete. At 56, a determination is made whether or not other blades are detected that need to be addressed for task completion. If no, the robot exits from under the lawn mower after completing task(s) at 57. However, if yes, the robot repeats the steps beginning with the detection of lawn mower cutting edges at 53.

Figure 8:
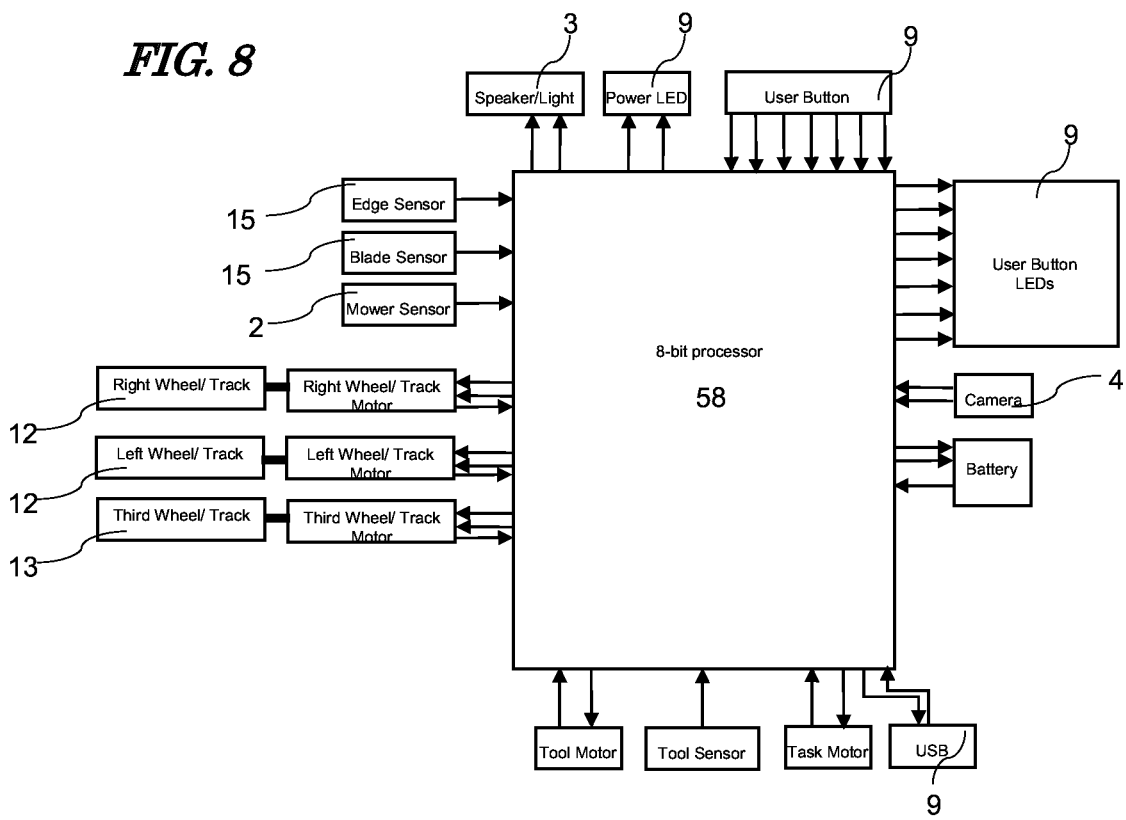
FIG. 8 is a hardware block diagram of an autonomous robot in accordance with an aspect of the present disclosure.

Referring now to FIG. 8, a hardware block diagram of the robot in accordance with one aspect of the present disclosure is shown. The robot may include an 8-bit (micro)processor 58, a sensor 2; a light 3; a camera 4; and a power source input 9 for power cables, USB cables, cable input sources, device receivers, remote receivers, external device receivers, and/or other cables to otherwise control or program the robot externally, wirelessly, and/or controlled by an owner. Right and left wheel(s) 12 (and/or track(s)) are provided for the purposes of moving the robot in any direction at a speed controlled by programming, device, owner, and/or settings. A third wheel, ball, and/or track 13 may be provided to assist in the steering and mobile refinement for lining up the robot for tasks in an accurate fashion and/or general motion purposes. A location 15 for the task tip is provided, wherein the task tip is integrated into the task arm, replaceable from the task arm, removable from the task arm, modular in relation to the task arm able to accommodate multiple different and/or similar task tips as a single tip and/or multiple tips at the same time and/or in conjunction with each other.

Next, referring to FIG. 9A-9O, various task tip and/or task arm configurations in accordance with embodiments of the present disclosure are shown.

FIG. 9A shows a lawn mower blade cutting edge sharpening task tip 63 in accordance with one aspect of the present disclosure. The lawn mower blade cutting edge sharpening task tip 63 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 63 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 63. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade.

FIG. 9B shows a lawn mower blade cutting edge sharpening task tip 64 in accordance with another aspect of the present disclosure. The lawn mower blade cutting edge sharpening task tip 64 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 64 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 64. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade.

FIG. 9C shows a lawn mower blade cutting edge cleaning task tip 65 in accordance with another aspect of the present disclosure. The lawn mower blade cutting edge cleaning task tip 65 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 65 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 65. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of cleaning a lawn mower blade.

FIG. 9D illustrates a lawn mower blade cutting edge conditioning task tip 66 in accordance with another aspect of the present disclosure. The lawn mower blade cutting edge conditioning task tip 66 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 66 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 66. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of conditioning a lawn mower blade.

FIG. 9E illustrates a lawn mower blade cutting edge and underside of lawn mower deck spraying task tip 67. The lawn mower blade cutting edge spraying task tip 67 may be made of hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece material that can be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot for the purposes of spraying fluids, water, conditioner, silicone, detergent, and/or other fluids in order to condition, clean, and/or treat lawn mower blades, lawn mower blade cutting edge(s), and/or underside of lawn mower decks. A task arm 62 may be provided for attachment to the task tip 67. This task arm 62 can be any suitable type, size, shape, material, and/or mobility, and may be either attached and/or integrated into a robot for the purposes of spraying fluids, water, conditioner, silicone, detergent, and/or other fluids in order to condition, clean, and/or treat lawn mower blades, lawn mower blade cutting edge(s), and/or underside of lawn mower decks.

FIG. 9F illustrates a lawn mower blade cutting edge cleaning task tip 68. The lawn mower blade cutting edge cleaning task tip 68 may be formed of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece material that can be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 68. This task arm 62 can be any kind, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of cleaning a lawn mower blade.

FIG. 9G shows a flat lawn mower blade cutting edge sharpening task tip 69 in accordance with another aspect of the present disclosure. The lawn mower blade cutting edge sharpening task tip 69 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 69 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 69. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade.

FIG. 9H illustrates a lawn mower blade, underside of lawn mower and/or lawn mower blade cutting edge camera task tip 4 in accordance with another aspect of the present disclosure. The lawn mower blade camera task tip 4 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 4 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 4. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes filming, recording, viewing, and/or taking pictures of a lawn mower blade, underside of lawn mower and/or lawn mower blade cutting edge.

FIG. 9I illustrates a lawn mower blade, underside of lawn mower and/or lawn mower blade cutting edge sensor task tip 2. The lawn mower blade sensor task tip 2 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 2 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 2. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes finding, sensing, calculating, signaling as it pertains to a lawn mower blade, underside of lawn mower and/or lawn mower blade cutting edge and/or the robot receiving sensor information.

FIG. 9J illustrates a lawn mower blade, underside of lawn mower and/or lawn mower blade cutting edge light/speaker task tip 3 in accordance with another aspect of the present disclosure. The lawn mower blade light/speaker task tip 3 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 3 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 3. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes finding, sensing, listening, and/or lighting in a certain area as it pertains to a lawn mower blade, underside of lawn mower and/or lawn mower blade cutting edge and/or the robot conducting tasks with light and sound for cameras, and/or sensors to function properly.

FIG. 9K illustrates a lawn mower blade cutting edge sharpening task tip 70 in accordance with another aspect of the present disclosure. The lawn mower blade cutting edge sharpening task tip 70 may be flat with or without rails that sharpen lawn mower blade edges by facilitating the sliding of the lawn mower blade cutting edge and the contralateral side of the lawn mower blade to ride in the channel between the rails. The lawn mower blade cutting edge sharpening task tip 70 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 70 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 70. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade.

FIG. 9L illustrates a lawn mower blade cutting edge track task tip 71 in accordance with another aspect of the present disclosure. The lawn mower blade cutting edge track task tip 71 may be flat with or without rails that facilitates any task modification and/or tip modification that would benefit from the use of a rail. The lawn mower blade cutting edge track task tip 71 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 71 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 71. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of needing a track to address needs relating to lawn mower blades, lawn mower blade cutting edges, and/or the underside of a lawn mower blade deck.

FIG. 9M illustrates a lawn mower blade task arm and/or task arm that may include articulations and/or swivels and/or adjustments in one and or multiple planes and/or sensors and/or cameras. A task tip 76, task arm 77, and cameras/sensors 78 are provided, while articulation points 79 are provided along task arm 77 to provide the appropriate articulation/swivel/adjustment.

FIG. 9N illustrates a lawn mower blade cutting edge sharpening task tip 80 in accordance with another aspect of the present disclosure. The lawn mower blade cutting edge sharpening task tip 80 may be flat and/or half-moon shape, and may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 80 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 80. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade.

Finally, FIG. 9O depicts a multi-purpose task tip and/or task arm 89 in accordance with another aspect of the present disclosure. The lawn mower blade cutting edge sharpening task tip 89 may be made of one or more materials that are hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece materials. Additionally, the task tip 89 may be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot. A task arm 62 may be provided for attachment to the task tip 89. This task arm 62 can be any suitable type, size, shape, material, and/or mobility, and may be either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of sharpening a lawn mower blade that may or may not be combined with a lawn mower blade cutting edge conditioning task tip that consists of a lawn mower blade cutting edge conditioning task tip that can be made of hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece material that can be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot, with a task arm that a task tip may or may not be attached to. This task arm can be any kind, a task arm of any size, a task arm of any shape, a task arm of any material, a task arm of any mobility, a task arm of any size, a task arm of either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of conditioning a lawn mower blade that may or may not be combined with a lawn mower blade cutting edge cleaning task tip that is a lawn mower blade cutting edge cleaning task tip that can be made of hard, soft, flexible, rigid, smooth, gritty, rough, abrasive, wet, dry, synthetic, natural, dyed, natural, polymer, rubber, stiff, bendable, moldable, wearable, non-wearable, heat resistant, all-weather, micro-beaded, nano-technology, nano-coated, hard metal, soft metal, steel, titanium, plastic, recyclable, single-piece, and/or multi-piece material that can be round, square, oval, oblong, rectangle, obtuse, multi-sided, diamond, triangular, half-moon, quarter-moon, semi-circular, and/or any shape or size that can rotate, oscillate, gyrate, agitate, spin, be replaceable, be permanent, be modular, be static, and/or pivot, with a task arm that a task tip may or may not be attached to. This task arm can be any kind, a task arm of any size, a task arm of any shape, a task arm of any material, a task arm of any mobility, a task arm of any size, a task arm of either attached and/or integrated into a robot for the purposes of carrying out tasks related to lawn mower blades and the underside of lawn mower decks, task arm platform, a track, any arm, any shaft, and/or mechanism attached to and/or a part of a robot for the purposes of cleaning a lawn mower blade.

Figure 10A:
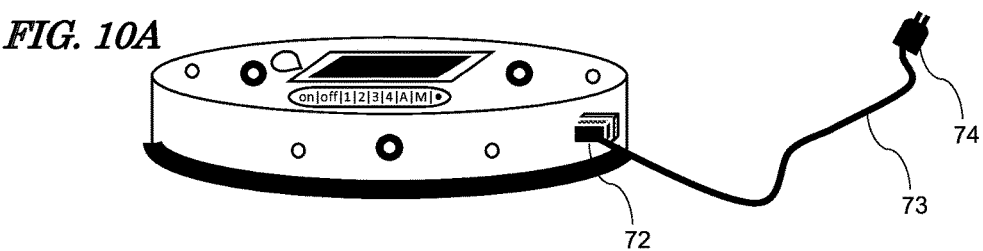
FIG. 10A is a side perspective view of an autonomous robot having a power cord in accordance with an aspect of the present disclosure.
Figure 10B:
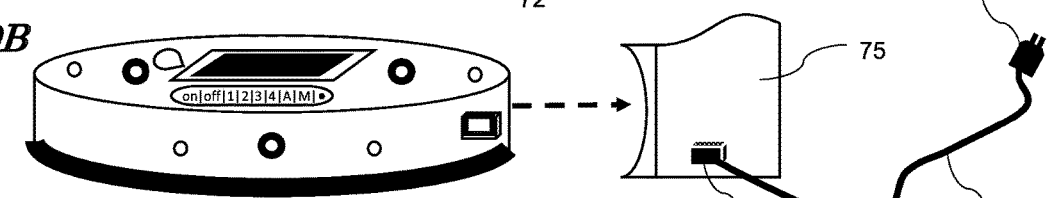
FIG. 10B is a side perspective view of an autonomous robot and docking station configuration in accordance with another aspect of the present disclosure.
Figure 10C:
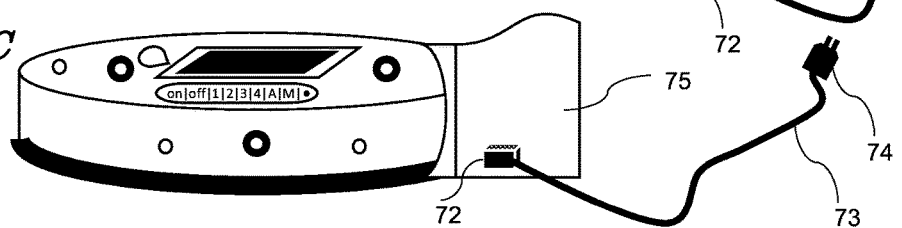
FIG. 10C is a side perspective view of the autonomous robot docked with the docking station as shown in FIG. 10B.

Referring now to FIGS. 10A-10C, various configurations for recharging and/or data transfer of the robot in accordance with aspects of the present disclosure are shown and described. FIG. 10A illustrates a robot with the power cord and/or power source that may recharge and/or charge an internal and/or removable battery and/or other power source. A connection port 72 may be provided on the robot, along with a power source cord 73 and a component 74 that plugs into an external power source.

FIG. 10B illustrates a configuration in which the robot may dock in a docking station 75. The docking station 75 may be configured to charge an internal and/or removable battery and/or other power source. FIG. 10C illustrates how the robot may be docked in a docking station 75. The robot may be configured to return to docking station 75 upon completion of all tasks. Alternatively, the robot may or may not have a docking station (or other home base) from which it comes and goes.

Figure 11A:
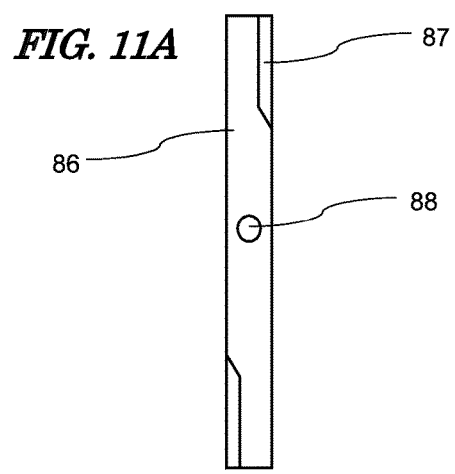
FIG. 11A is a top view of a lawn mower blade in accordance with an aspect of the present disclosure.

Next, referring to FIG. 11A, a lawn mower blade 86 is shown. The lawn mower blade 86 includes cutting edges 87 and a center/opening 88 of the lawn mower blade where the blade may connect via a nut, screw, and/or otherwise to a spindle which may be connected to the lawn mower's drive train and/or engine and may be driven through a belt and/or series of belts to turn the blade when engaged.

Figure 11B:
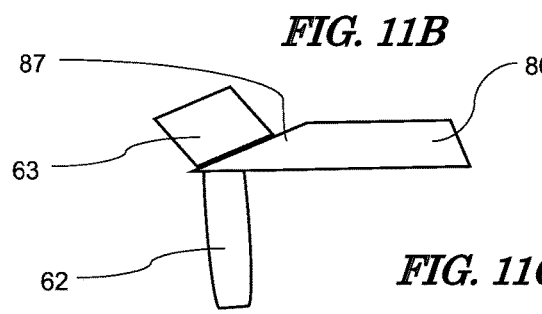
FIG. 11B is a partial side view of a task tip and/or task arm engaged with a lawn mower blade in accordance with an aspect of the present disclosure.
Figure 11C:
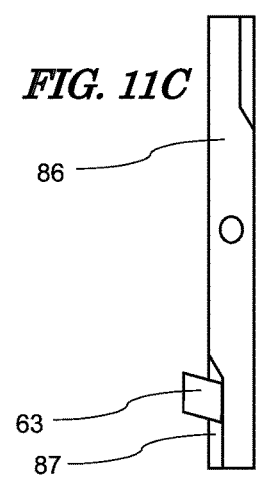
FIG. 11C is an overhead view of a task tip and/or task arm engaged with a lawn mower blade in accordance with an aspect of the present disclosure.

FIG. 11B illustrates a side view of an example of how a task tip 63 and/or task arm 62 may engage and/or otherwise may contact with a lawn mower blade 86 and/or the lawn mower blade cutting edge 87 in accordance with an aspect of the present disclosure. FIG. 11C illustrates an overhead view of how the task tip 63 and/or task arm 62 may engage and/or otherwise contact a lawn mower blade 86 and/or the lawn mower blade cutting edge 87 in accordance with various aspects of the present disclosure.

Figure 12A:
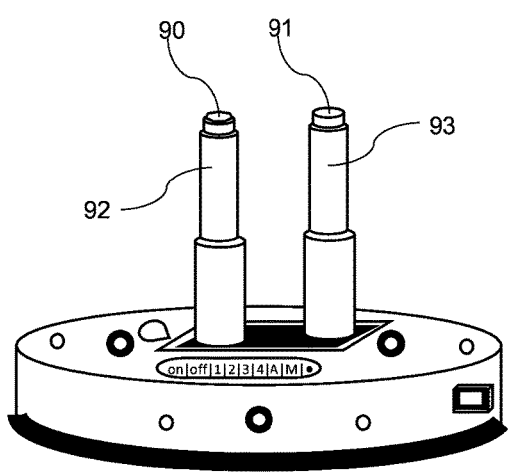
FIG. 12A is a side perspective view of an autonomous mower configured for changing lawn mower blades in accordance with an aspect of the present disclosure.
Figure 12B:
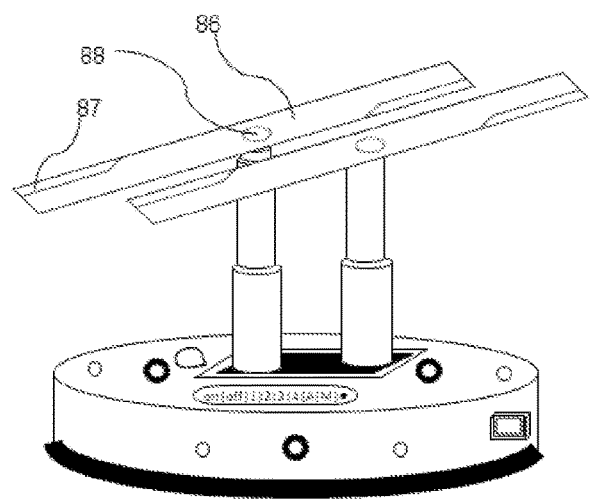
FIG. 12B is a side perspective view of the autonomous mower of FIG. 12A having lawn mower blades engaged therewith.

Next, referring to FIG. 12A, a robot component for changing a lawn mower blade(s) in accordance with another aspect of the present disclosure is illustrated. A component 90 is provided on the robot, wherein component 90 is configured to remove and/or replace a nut and/or screw and/or other means of fixation of lawn mower blade to a lawn mower. A magnet 91 and/or some other way in which to grab and/or affix and/or hold a lawn mower blade is also provided. A first arm 92 is provided to secure and/or grasp the old and/or used lawn mower blade, while a second arm 93 is provided to secure and/or grasp the new and/or replacement lawn mower blade. Referring to FIG. 12B, an example configuration of how a lawn mower blade(s) would affix and/or rest and/or spins and/or shifts and/or engages and/or otherwise interact with the lawn mower blade(s) changing component of a robot is shown.

Figure 13:
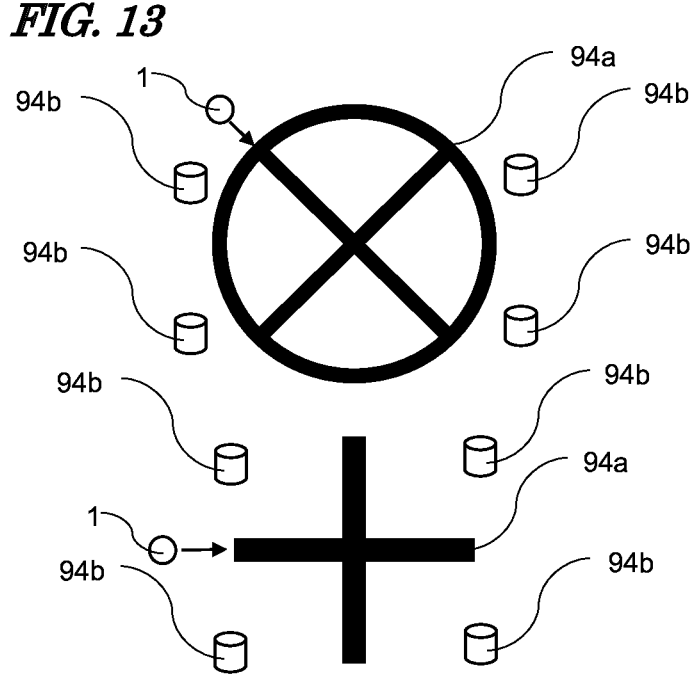
FIG. 13 is a schematic view of a pattern for tracking or guiding an autonomous robot in accordance with an aspect of the present disclosure.

Referring now to FIG. 13 is a schematic view of a pattern for tracking or guiding an autonomous robot in accordance with an aspect of the present disclosure is shown. FIG. 13 depicts a pattern(s) that may be used and/or may include one or more of paint, grid, tape, physical structure, a material affixed to or laid upon the ground, a series of sensor(s), a series of camera(s), and/or any other material which capable of being utilized as a track and/or for guidance for a robot to follow optically and/or sensory and/or by robot being physically attached to a physical track/structure. One or more patterns 94a are provided comprising one or more of paint, grid, tape, physical structure, a material affixed to or laid upon the ground, a series of sensor(s), a series of camera(s), and/or any other material which capable of being utilized as a track and/or for guidance for a robot to follow. Towers 94b may be included to provide guidance to the robot 1 through at least one of camera(s) 4, sensor(s) 2, machine learning, object recognition, spatial recognition, learned behavior, preprogramming, tactile feel, computer programming, microprocessor, and/or owner device direction and/or owner manual direction, which may be used in place of and/or in conjunction with the autonomous aspect of the robot.

Figure 14:
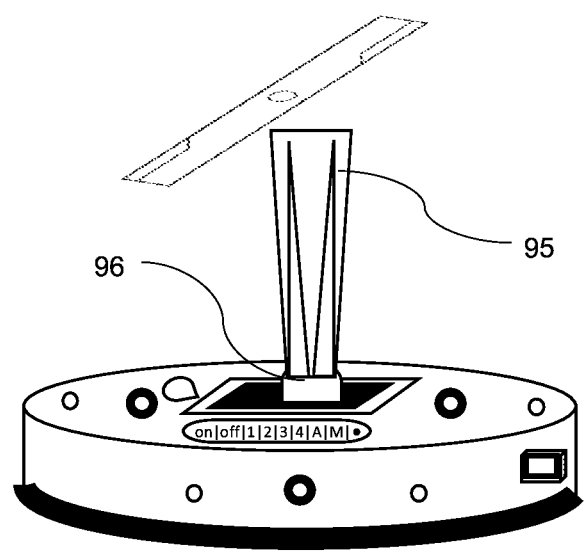
FIG. 14 is a side perspective view of an autonomous robot having a scanning component in accordance with another aspect of the present disclosure.

FIG. 14 illustrates a scanning component to a robot in accordance with another aspect of the present disclosure. Rays 95 of a scan that scans the lawn mower blade may be provided by a source 96 of the scan beams, wherein the source may be located on a top surface of the robot. With this configuration, the scanning component could be used to determine the type, size, age, condition, etc. of the lawn mower blade.

Figure 15:
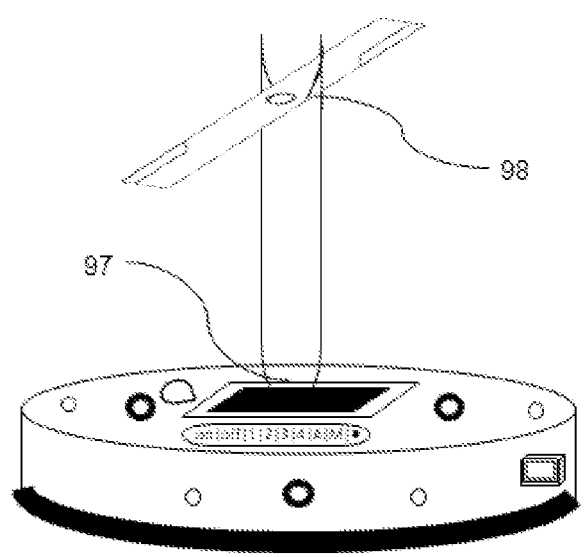
FIG. 15 is a side perspective view of an autonomous robot configured to grasp a lawn mower blade in accordance with another aspect of the present disclosure.

Referring to FIG. 15 an example of a manner in which a robot grabs and/or hangs and/or grasps and/or clings and/or captures a lawn mower blade in accordance with another aspect of the present disclosure is illustrated. A grasping mechanism 97 may be provided on the robot to connect and/or engage a lawn mower blade, with an interface 98 provided for the connection between the lawn mower blade and the grasping mechanism 97. In this way, the robot may physically capture and hold the lawn mower blade for sharpening, cleaning, removal, replacement, etc.

Referring back to FIGS. 1A-1C, it is to be understood that the robot 1 may be controlled by at least one of wirelessly, by the owner, by a device (as shown in FIG. 0.4), by cable(s), by cord(s), by voice command(s), by sound (s), by light(s), by visualization, by sensors, by cameras, by artificial intelligence, by machine learning, by object recognition, by spatial recognition, by behavior based architecture that is used to implement the control system, by data transmission and/or manually for the purpose(s) of completing autonomous tasks and/or determined tasks and/or directed tasks such as, but not limited to sharpening lawn mower blade(s) and/or lawn mower blade(s) cutting edge(s) (as shown in FIGS. 9A, 9B, 9G, 9K, 9L), cleaning lawn mower blade(s) and/or lawn mower blade(s) cutting edge(s) (as shown in FIG. 9C-9F), conditioning lawn mower blade(s) and/or lawn mower blade(s) cutting edge(s) (as shown in FIG. 9D), spraying under the lawn mower deck and/or spraying lawn mower blade(s) and/or lawn mower blade(s) cutting edge(s) (as shown in FIG. 9E), visualize and/or detect and/or evaluate and/or provide feedback and/or determine action and/or start/pause/stop a specific task(s) at any time and/or control all things task related, of lawn mower blade(s) and/or lawn mower blade(s) cutting edge(s) and/or underside of lawn mower deck (as shown in FIG. 9H), sense and/or detect and/or evaluate and/or provide feedback and/or determine action and/or start/pause/stop a specific task(s) at any time and/or control all things task related of lawn mower blade(s) and/or lawn mower blade(s) cutting edge(s) and/or underside of lawn mower deck (as shown in FIG. 9I), provide light and/or an audible speaker/microphone for lawn mower blade(s) and/or lawn mower blade(s) cutting edge(s) and/or underside of lawn mower deck (as shown in FIG. 9J), provide the flexibility and/or movement and/or optical and/or audible elements to task tips and/or task arms (as shown in FIG. 9M), provide an additive component to repair lawn mower blade(s), and/or lawn mower blade(s) cutting edges(s) and/or the underside of the lawn mower deck such as, but not limited to, chips, dings, and/or dents. Task arm(s) and/or task tip(s) may be configured to move independent of each other, as well as independent of the robot, through separate abilities to articulate and/or raise and/or lower and/or oscillate and/or spin and/or otherwise any motion and/or movement.

In accordance with one embodiment, the robot may be docked (as shown in FIGS. 10B-10C) and/or plugged in (as shown in FIG. 10A) in an electrical outline in a house, garage, shed, warehouse, work space, workshop, in the field, by means of various types of outlets, and/or docking station(s) or other location(s) in order to charge, recharge, and/or keep battery charged through electricity and/or solar and/or wind and/or hydro-power and/or manual-power and/or battery in order for robot to function when powered on. Once sufficiently charged, an owner may unplug the robot from outlet and/or docking station 75 and/or places robot on flat and/or close to flat ground within a proximity of desired lawn mower(s) blade(s) needing task attention and/or the owner activates robot by the on/off button 7, and/or motion activation 2, 4, and/or voice activation 3, and/or device (shown in FIG. 4) activation. The owner then places and/or leaves robot in current location and/or position to give the robot the opportunity for the next movement/process, which is to locate lawn mower(s).

Once the robot is powered on/activated/awakened from sleep mode through a manual button on the robot and/or a wireless device and/or a remote, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot will move and/or remain immobile to inspect and detect the lawn mower(s), lawn mower(s) wheels/tires, and/or lawn mower(s) mower deck where the lawn mower blades are located (as described with respect to FIG. 7) within certain vicinity of the robot. While the robot moves, its duster/skirt 8 keeps debris from going under the robot.

Once any one and/or multiple of the lawn mower(s) and/or lawn mower wheel(s) and/or lawn mower deck(s) are detected and/or recognized through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot will search and/or process an optimal way (as shown and described with respect to FIGS. 5A-5D) in which to enter and/or exit under the lawn mower in order to complete a pre-determined and/or determined "on-the-spot" and/or designated and/or processed and/or evaluated and/or inspected task through at least one of camera(s) 4, sensor(s) 2, machine learning, object recognition, spatial recognition, learned behavior, preprogramming, tactile feel 85, computer programming, microprocessor, and/or owner device direction and/or owner manual direction.

If the robot is not able to go under the lawn mower deck(s), it may or may not make an audible noise through the speaker 3 and/or show a read out on the robot display 7a and/or go back to its starting position. At this time, the owner may choose to use jacks 99 to lift lawn mower if it is too low.

The robot may be noise sensitive through its microphone 3, so if at any time the lawn mower has its engine running, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the noise will prevent the robot from approaching the lawn mower. Furthermore, if the robot is under the lawn mower and the lawn mower starts up (i.e., the engine begins to run) and the robot senses this via its microphone 3, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot will discontinue its current operation, whether it is task(s) and/or conducting coverage, the robot will find the nearest exit from under the lawn mower, and the robot will exit from under the lawn mower.

Once the robot has entered under the lawn mower deck, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot light 3 may illuminate and/or the scanner may scan (as described with respect to FIG. 14) and the robot may send suggestions and/or options and/or action items to the owner via a wireless device, wired device, corded remote, and/or on-the-robot display, and/or the robot begins and/or completes its task on each and every lawn mower blade(s), and/or lawn mower blade(s) cutting edge(s) and/or underside of lawn mower deck in a coverage pattern (such as those shown and described with respect to FIGS. 6A-6D) determined through at least one of camera(s) 4, sensor(s) 2, machine learning, object recognition, spatial recognition), learned behavior, preprogramming, tactile feel 85, computer programming, microprocessor, and/or owner device direction and/or owner manual direction.

An alternative way in which a robot may complete tasks under a lawn mower and/or progress under a lawn mower may be through at least one of camera(s) 4, sensor(s) 2, machine learning object recognition, spatial recognition, learned behavior, preprogramming, tactile feel 85, computer programming, microprocessor, and/or owner device direction and/or owner manual direction that follows patterns (such as that which is shown in FIG. 13) that may include paint, grid, tape, structure, something affixed to or laid upon the ground, a series of sensor(s), a series of camera(s), and/or any other material which is meant to be a track and/or guidance for a robot to follow.

Once the robot determines which lawn mower blade(s) to service, it travels to the blade(s). Then, through at least one of camera(s) 4, sensor(s) (2), machine learning, object recognition, spatial recognition, learned behavior, preprogramming, tactile feel 85, computer programming, microprocessor, and/or owner device direction and/or owner manual direction, the robot determines the exact location of the lawn mower blade(s) cutting edge(s) through at least one of camera(s) 4, sensor(s) 2, machine learning, object recognition, spatial recognition, learned behavior, preprogramming, tactile feel 85, computer programming, microprocessor, and/or owner device direction and/or owner manual direction and/or calculations. Once the lawn mower blade(s) cutting edge(s) are located, through at least one of camera(s) 4, sensor(s) 2, machine learning, object recognition, spatial recognition, learned behavior, preprogramming, tactile feel

85, computer programming, microprocessor, and/or owner device direction and/or owner manual direction, the robot may evaluate the lawn mower blade(s) cutting edge to determine the task that needs to be completed through at least one of camera(s) 4, sensor(s) 2, machine learning, object recognition, spatial recognition, learned behavior, preprogramming, tactile feel 85, computer programming, microprocessor, and/or owner device direction and/or owner manual direction. Once the task that needs to be completed is determined through at least one of camera(s) 4, sensor(s) 2, machine learning, object recognition, spatial recognition, learned behavior, preprogramming, tactile feel 85, computer programming, microprocessor, and/or owner device direction and/or owner manual direction, the appropriate task arm and/or task tip is selected through at least one of camera(s) 4, sensor(s) 2, machine learning, object recognition, spatial recognition, learned behavior, preprogramming, tactile feel 85, computer programming, microprocessor, and/or owner device direction and/or owner manual direction and/or placed and/or positioned on the robot and/or positioned in the appropriate and/or various location(s) in relation to the lawn mower blade(s) and/or lawn mower blade(s) cutting edge(s) in order to complete the task(s) in the most efficient and/or accurate manner through at least one of camera(s) 4, sensor(s) 2, machine learning, object recognition, spatial recognition, learned behavior, preprogramming, tactile feel 85, computer programming, microprocessor, and/or owner device direction and/or owner manual direction. These task arms and/or task tips (such as those shown in FIGS. 3A-3H and/or FIGS. 9A-9N) may be deployed and/or positioned and/or docked (as shown in FIG. 15) and/or fixated and/or married to the lawn mower blade(s) (as shown in FIGS. 11A-11C) and/or lawn mower blade(s) cutting edge(s) 87 through at least one of camera(s) 4, sensor(s) 2, machine learning, object recognition, spatial recognition, learned behavior, preprogramming, tactile feel 85, computer programming, microprocessor, and/or owner device direction and/or owner manual direction through various angles and/or various heights and/or various widths and/or various lengths and/or raising and/or lowering and/or swinging and/or articulating and/or telescoping and/or scissoring and/or expanding and/or various locations on the robot and/or in a static state and/or multiple task(s) arm(s) and/or multiple task(s) tip(s) and or single task arm(s) and/or task tip(s). If at any point the robot determines, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot will use the appropriate task arm(s) and/or task tip(s) to scrape and/or clean and/or condition and/or treat the underside of the lawn mower deck and/or lawn mower blade(s) and/or lawn mower blade(s) cutting edge(s).

An example for a lawn mower blade cutting edge(s) sharpening task in accordance with one aspect of the present disclosure may proceed as follows: through at least one of camera(s) 4, sensor(s) 2, machine learning, object recognition, spatial recognition, learned behavior, preprogramming, tactile feel 85, computer programming, microprocessor, and/or owner device direction and/or owner manual direction, the cutting edge is evaluated for the appropriate task. In this case, the robot, through at least one of camera(s) 4, sensor(s) 2, machine learning, object recognition, spatial recognition, learned behavior, preprogramming, tactile feel 85, computer programming, microprocessor, and/or owner device direction and/or owner manual direction, detects and/or determines that the lawn mower blade cutting edge is dull and needs to be sharpened. At this point, through at least one of camera(s) 4, sensor(s) 2, machine learning, object recognition, spatial recognition, learned behavior, preprogramming, tactile feel 85, computer programming, microprocessor, and/or owner device direction and/or owner manual direction, through at least one of a sharpening arm is activated, resulting in the placement and/or engagement of the sharpening task tip(s) onto the dull lawn mower blade cutting edge(s). At this point, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the angle of the lawn mower blade cutting edge is located and/or determined and the sharpening task tip adjusts accordingly to this angle through at least one of camera(s) 4, sensor(s) 2, machine learning, object recognition, spatial recognition, learned behavior, preprogramming, tactile feel 85, computer programming, microprocessor, and/or owner device direction and/or owner manual direction. Furthermore, it is determined how dull and/or how much sharpening needs to occur to achieve the optimal, predetermined sharpness of that lawn mower blade cutting edge through optical alignment of sensors and/or cameras and/or calculations, all of which is done through at least one of camera(s) 4, sensor(s) 2, machine learning, object recognition, spatial recognition, learned behavior, preprogramming, tactile feel 85, computer programming, microprocessor, and/or owner device direction and/or owner manual direction. Once these determinations are complete, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the task begins. At this point, the robot and/or the task arm and/or the task tip is determined (e.g., as shown in FIGS. 9A-9O) which is preset and/or selected through at least one of camera(s) 4, sensor(s) 2, machine learning, object recognition, spatial recognition, learned behavior, preprogramming, tactile feel 85, computer programming, microprocessor, and/or owner device direction and/or owner manual direction, wherein the robot, task arm, and/or task tip moves in a fashion that sharpens the lawn mower blade cutting edge through, but not limited to, task arm(s) spinning, moving, oscillating, gyrating, rotating, and/or otherwise moving in an efficient way to complete the task(s), and/or task tip(s) spinning, moving, oscillating, gyrating, rotating, and/or otherwise moving in an efficient way to complete the task(s), the motion and/or combined contact of the sharpening task tip on the lawn mower blade cutting edge, resulting in a very accurate, balanced blade(s) measurement(s) and efficient sharpening of the lawn mower blade cutting edge for optimal cutting performance, which is completed through at least one of camera(s) 4, sensor(s) 2, machine learning, object recognition, spatial recognition, learned behavior, preprogramming, tactile feel 85, computer programming, microprocessor, and/or owner device direction and/or owner manual direction. This is one example of how, through at least one of camera(s) 4, sensor(s) 2, machine learning, object recognition, spatial recognition, learned behavior, preprogramming, tactile feel 85, computer programming, microprocessor, and/or owner device direction and/or owner manual direction, task(s) are completed with the combination of a robot and/or task arm and/or task tip and/or movement and/or accuracy and/or appropriate adjustments.

Through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot may have the ability to expand and/or contract in all directions and/or planes through various means, including, but not limited to, clamshell design (as shown in FIG. 3I) and/or riding on posts (as shown in FIG. 3J) and/or air/fluid bladder (as shown in FIG. 3K) and/or oscillating on itself/a track/a pad and/or by other means that may or may not be driven by mechanical, fluid, pneumatic, springs, electric, and/or solar means. The robot may start in a contracted state and expand through at least one of camera(s) 4, sensor(s) 2, machine learning, object recognition, spatial recognition, learned behavior, preprogramming, tactile feel 85, computer programming, microprocessor, and/or owner device direction and/or owner manual direction, and/or robot may start in an expanded state and contract through at least one of camera(s) 4, sensor(s) 2, machine learning, object recognition, spatial recognition, learned behavior, preprogramming, tactile feel 85, computer programming, microprocessor, and/or owner device direction and/or owner manual direction in order to have the ability to enter and/or exit under the lawn mower(s) deck(s) and/or complete task(s). Through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot may have the ability to gyrate and/or spin and/or rotate and/or vibrate and/or counterbalance and/or agitate and/or shuffle and/or shimmy and/or bounce and/or rock and/or conduct any other motion (as shown in FIG. 3L) for the purposes of entering and/or exiting under the lawn mower deck(s) and/or starting and/or pausing and/or stopping and/or completing task(s).

After all of the task(s) are completed, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot, through a device or manually by the owner, determines where to return through at least one of camera(s) 4, sensor(s) 2, machine learning, object recognition, spatial recognition, learned behavior, preprogramming, tactile feel 85, computer programming, microprocessor, and/or owner device direction and/or owner manual direction. The robot will then determine and/or be told tasks are complete and exit from under the lawn mower (as shown in FIGS. 6A-D andFIGS. 5A-5D). The robot will exit from under the lawn mower and/or return to a designated area and/or docking station and/or original point of start and/or location determined by owner through a device and/or determined by owner manually and/or determined where to return through at least one of camera(s) 4, sensor(s) 2, machine learning, object recognition, spatial recognition, learned behavior, preprogramming, tactile feel 85, computer programming, microprocessor, and/or owner device direction and/or owner manual direction.

At this point, information may be downloaded, viewed on device (as shown in FIG. 4), viewed on robot display 7a, the robot may be recharged by owner, robot may be plugged in by owner, robot may be placed at another location by owner, robot may be left on the ground, robot may be placed and/or self-docked in docking station for charging or not for charging, robot may be placed and/or manually-docked in docking station for charging or not for charging. Robot task arm(s) and/or task tip(s) may be inspected and/or replaced and/or added or taken away from robot for future tasks and/or adjusted in any way. Robot information may be read on a device and/or the robot that may include tasks completed, tasks to be completed next session, task arms used, task tips used, next time certain tasks need completion, how many times certain task(s) have been completed since last lawn mower blade(s) replacement, task arms that need attention, task tips that need attention, and/or any element of the robot that needs attention.

Once the robot is recharged and all items that required attention regarding the robot and its elements are attended to, the robot will be ready to begin tasks yet again.

The robot of the present disclosure may be used for, but not limited to, commercial lawn mowers/tractors, municipal lawn mowers/tractors, residential lawn mowers/tractors, gas powered lawn mowers/tractors, electric lawn mowers/tractors, battery lawn mowers/tractors, push lawn mowers/tractors, riding lawn mowers/tractors, walk-behind lawn mowers/tractors, pull-behind lawn mowers/tractors, ride-on lawn mowers/tractors, solar lawn mowers/tractors, hydro lawn mowers/tractors, robotic lawn mowers/tractors, and/or any other variation of design and/or powered or self-propelled lawn mowers/tractors.

These task(s) may also be completed by a physical mat being placed under the lawn mower(s) and the robot follow the incorporated coverage and/or pattern of the mat through at least one of camera(s) 4, sensor(s) 2, machine learning, object recognition, spatial recognition, learned behavior, preprogramming, tactile feel 85, computer programming, microprocessor, and/or owner device direction and/or owner manual direction.

Through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot may learn and become smarter as it completes more task(s), resulting in the ability for the robot to conduct task(s) more efficiently and/or present more precise detailed information about lawn mower blade(s), lawn mower blade(s) cutting edge(s), and/or lawn mower deck(s).

Through at least one of camera(s) 4, sensor(s) 2, machine learning, object recognition, spatial recognition, learned behavior, preprogramming, tactile feel 85, computer programming, microprocessor, and/or owner device direction and/or owner manual direction, the robot can work on several lawn mower(s) blade(s) and/or lawn mower blade(s) cutting edge(s) and/or lawn mower(s) decks when there is a shop or area full of mowers. The robot can go from one mower(s) to another and report what each mower(s) task(s) were and action(s) needed and/or attention needed per lawn mower(s) and/or lawn mower(s) blade(s) and/or lawn mower blade(s) cutting edge(s). Such a shop or area is common in relation to a municipal mowing division and/or a commercial mowing/landscape garage and/or a golf course grounds crew and/or an athletic field(s) grounds crew.

Through at least one of camera(s) 4, sensor(s) 2, machine learning, object recognition, spatial recognition, learned behavior, preprogramming, tactile feel 85, computer programming, microprocessor, and/or owner device direction and/or owner manual direction, if it is determined that a blade and/or blades need to be replaced, the blade changing robot component (e.g., as shown in FIGS. 12A-12B) and/or task setting may be implemented and/or started.

An example for a lawn mower blade cutting edge(s) sharpening task in accordance with an aspect of the present disclosure may proceed as follows: through at least one of camera(s) 4, sensor(s) 2, machine learning, object recognition, spatial recognition, learned behavior, preprogramming, tactile feel 85, computer programming, microprocessor, and/or owner device direction and/or owner manual direction, the cutting edge is evaluated for the appropriate task. In this case, the robot, through at least one of camera(s) 4, sensor(s) 2, machine learning, object recognition, spatial recognition, learned behavior, preprogramming, tactile feel 85, computer programming, microprocessor, and/or owner device direction and/or owner manual direction, detects and/or determines that the lawn mower blade cutting edge is dull and needs to be sharpened. At this point, through at least one of camera(s) 4, sensor(s) 2, machine learning, object recognition, spatial recognition, learned behavior, preprogramming, tactile feel 85, computer programming, microprocessor, and/or owner device direction and/or owner manual direction, a sharpening arm is activated, resulting in the placement and/or engagement of the sharpening task tip(s) onto the dull lawn mower blade cutting edge(s). At this point, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the angle of the lawn mower blade cutting edge is located and/or determined and the sharpening task tip adjusts accordingly to this angle through at least one of camera(s) 4, sensor(s) 2, machine learning, object recognition, spatial recognition, learned behavior, preprogramming, tactile feel 85, computer programming, microprocessor, and/or owner device direction and/or owner manual direction, and furthermore, it is determined how dull and/or how much sharpening needs to occur to achieve the optimal, predetermined sharpness of that lawn mower blade cutting edge through optical alignment of sensors and/or cameras and/or calculations, all of which is done through at least one of camera(s) 4, sensor(s) 2, machine learning, object recognition, spatial recognition, learned behavior, preprogramming, tactile feel 85, computer programming, microprocessor, and/or owner device direction and/or owner manual direction. Once these determinations are complete, through at least one of camera(s) 4, sensor(s) 2, machine learning, object recognition, spatial recognition, learned behavior, preprogramming, tactile feel 85, computer programming, microprocessor, and/or owner device direction and/or owner manual direction, the task begins. At this point, the robot and/or the task arm and/or the task tip move in a fashion that sharpens the lawn mower blade cutting edge through, but not limited to, task arm(s) spinning, moving, oscillating, gyrating, rotating, and/or otherwise moving in an efficient way to complete the task(s), and/or task tip(s) spinning, moving, oscillating, gyrating, rotating, and/or otherwise moving in an efficient way to complete the task(s), the motion and/or combined contact of the sharpening task tip on the lawn mower blade cutting edge, resulting in a very accurate, balanced blade(s) measurement(s) and efficient sharpening of the lawn mower blade cutting edge for optimal cut quality which was completed through at least one of camera(s) 4, sensor(s) 2, machine learning, object recognition, spatial recognition, learned behavior, preprogramming, tactile feel 85, computer programming, microprocessor, and/or owner device direction and/or owner manual direction. This is one example of how, through at least one of camera(s) 4, sensor(s) 2, machine learning, object recognition, spatial recognition, learned behavior, preprogramming, tactile feel 85, computer programming, microprocessor, and/or owner device direction and/or owner manual direction, task(s) are completed with the combination of a robot and/or task arm and/or task tip and/or movement and/or accuracy and/or appropriate adjustments.

The mower is not meant to be on, running, or have the blades in motion while the robot is in its vicinity. The robot is kept in an area free and clear of debris and objects, and kept with a charged battery. The owner ideally raises the lawn mower deck to the highest setting. The robot is to be on the ground, or placed on the ground, in close proximity to the lawn mower which the owner desires to have the blades sharpened. The robot is either already powered on, or the owner powers on the robot. If the robot is already on, the owner will awaken it with a movement or by pressing an activate button, while if the robot is turned off, the same activation will occur by the owner turning the power button on. Once the robot is on/activated, the camera(s) and sensor(s) will begin to look for a lawn mower through object recognition and spatial recognition. Alternatively, the owner may choose to place the robot under the lawn mower manually by hand, or by a pole/placement device. Once the robot finds the lawn mower, it will locate the lawn mower deck, once again through camera(s) and/or sensor(s). Once it autonomously drives under the lawn mower deck, the robot will locate the lawn mower blade(s) and lawn mower blade cutting edges through at least one of camera(s) and/or sensor(s), object recognition, and/or spatial recognition. At this point, the robot will know, through programming, artificial intelligence, machine learning, instructions, etc. to complete the assigned task. Once this task is complete, the robot will, again, through at least one of camera(s) and/or sensor(s), object recognition and/or spatial recognition, look for other cutting edges and/or blades until all of the tasks are complete for each blade and/or cutting edge. When all tasks are complete, the robot will autonomously and/or by direction drive from under the lawn mower, and return back to the original location where it started and/or where it was located when awoken and/or activated which may or may not be a docking station.

While not shown, in accordance with another aspect of the disclosure, it is to be understood that the robot 1 may include at least one handle, arm, or shaft to enable the user to carry the robot land/or position the robot relative to the mower. In accordance with one embodiment, the robot 1 is positioned within a certain range or area of the mower prior to operation. However, in other embodiments, the robot 1 need not be positioned within such a range or area.

Furthermore, in accordance with another aspect of the present disclosure, the robot may be in communication with, or may itself hold, a computer-readable memory device storing a database thereon. The database may contain various makes, models, year, style of a mower, and/or any other detail relating to a mower and/or specifications and/or features and/or requirements and/or maintenance items related to a mower. The owner may access the database via, e.g., the device 20, and select from the database the proper mower in order for the robot to know and understand the mower to be worked upon in order to complete various tasks. The robot may then recognize the mower and/or complete any tasks based upon input from the user correlating to the database.

In another aspect of the present disclosure, the robot 1 may respond to voice activated/commanded directions.

In accordance with another aspect of the present disclosure, the robot 1 may be controlled and/or observed by one or more Virtual Reality (VR) device(s).

Furthermore, in accordance with another aspect of the disclosure, the robot 1 may be manufacturer/make/model agnostic, and thus will complete task(s) on any appropriate mower. However, in another aspect of the disclosure, the robot 1 may be manufacturer and/or make and/or model specific, and thus will only complete task(s) on certain mowers.

In another aspect of the present disclosure, the lawn mower may come equipped (by manufacturer) with integrated sensors, fiducials, and/or any other appropriate receiver or marker to direct and/or guide and/or command robot to complete task(s). Alternatively, the robot 1 may come equipped with sensors, fiducials, and/or any other receiver or marker to direct and/or guide and/or command the robot to complete task(s) by placing them anywhere on the mower.

In another aspect of the present disclosure, the robot 1 can be integrated in a platform positioned on the ground, over which the mower is positioned when a task is desired to be performed. Additionally and/or alternatively, the robot 1 can be integrated into a benchtop setting and/or apparatus.

Furthermore, in another aspect of the disclosure, the robot 1 may be retrofitted with lawn mowing capabilities and/or parts in a modular fashion. In yet another aspect of the disclosure, the robot 1 may be retrofitted to an existing lawnmower robot in a modular and/or fixed fashion.

It is understood that many variations, changes, and modifications may be made and effected in the present invention, although it has been detailed and specific in its embodiments and descriptions.

What is claimed is:

1. A lawn mower maintenance robot, comprising:
    a robot body having a form factor suitable for accessing an area underneath a deck of a lawn mower while the lawn mower is resting on the ground;
    a set of wheels on an underside of the robot body;
    a motor in the robot body to drive the set of wheels;
    at least one task arm coupled to an upper surface of the robot body, wherein the at least one task arm includes a sharpening tip suitable for performing sharpening of one or more blades of the lawn mower underneath the deck;
    one or more positioning sensors to generate sensing data indicative of position of the robot body relative to the lawn mower and indicative of position of the sharpening tip relative to the one or more blades of the lawn mower; and
    a controller configured to obtain the sensing data from the one or more positioning sensors, to autonomously control the motor based on the sensing data to navigate the lawn mower maintenance robot from a starting position outside the deck of the lawn mower to the area underneath the deck of the lawn mower, and the controller configured to control an action of the task arm based at least in part on the sensing data to perform a sharpening task on the one or more blades while underneath the deck of the lawn mower.

2. The lawn mower maintenance robot of claim 1, wherein the controller is configured to interface with a remote device to receive a control signal from the remote device that initiates the sharpening task.

3. The lawn mower maintenance robot of claim 1, wherein the controller is further configured to receive lawn mower configuration information from a remote device indicative of a blade configuration of the lawn mower, and wherein controlling the action of the task arm to perform the sharpening task is based in part on the lawn mower configuration information.

4. The lawn mower maintenance robot of claim 1, wherein the one or more positioning sensors include
    a camera to capture a video feed; and
    wherein the lawn mower maintenance robot further comprises a transmitter to stream the video feed to a remote viewing device.

5. The lawn mower maintenance robot of claim 1, wherein the controller is further configured navigate the lawn mower maintenance robot around a radius of the lawn mower to detect a suitable entry point to the area underneath the deck, and configure the lawn mower maintenance robot to navigate to the area underneath the deck via the entry point.

6. The lawn mower maintenance robot of claim 5, wherein detecting the suitable entry point comprises:
    detecting, based on the sensing data, locations of wheels of the lawn mower; and
    detecting the suitable entry point located between the wheels.

7. The lawn mower maintenance robot of claim 1, wherein the controller is configured to navigate the lawn mower maintenance robot according to a navigation path comprising:
    navigating to a first cutting edge of a first blade to perform sharpening of the first cutting edge of the first blade;
    navigating to a second cutting edge of the first blade to perform sharpening of the second cutting edge of the first blade;
    navigating to a cutting edge tip of a second blade to perform sharpening of the first cutting edge of the second blade; and
    navigating to a second cutting edge of the second blade to perform sharpening of the second cutting edge of the second blade.

8. The lawn mower maintenance robot of claim 1, further comprising:
    one or more electronically-controlled components for automatically grabbing the one or more blades of the lawn mower, removing the one or more blades from the lawn mower, and for attaching one or more replacement blades to the lawn mower.

9. The lawn mower maintenance robot of claim 1, further comprising:
    a scanning component to scan the lawn mower and to automatically identify a characteristic of the lawn mower including at least one of a type, size, age, and condition of the lawn mower blade.

10. The lawn mower maintenance robot of claim 1, wherein the sharpening tip is removable is interchangeable with one or more other task tips for performing an additional maintenance task.

11. A method for operating a lawn mower maintenance robot, wherein the lawn mower maintenance robot includes a robot body having a form factor suitable for accessing an area underneath a deck of a lawn mower while the lawn mower is resting on the ground, a set of wheels on an underside of the robot body, a motor in the robot body to drive the set of wheels, and at least one task arm coupled to an upper surface of the robot body, wherein the at least one task arm includes a sharpening tip suitable for performing sharpening of one or more blades of the lawn mower underneath the deck, the method comprising:
    generating, by one or more positioning sensors, sensing data indicative of position of the robot body relative to the lawn mower and indicative of position of the sharpening tip relative to the one or more blades of the lawn mower;

obtaining, by a controller, the sensing data from the one or more positioning sensors;

autonomously controlling, by the controller, the motor based on the sensing data to navigate the lawn mower maintenance robot from a starting position outside the deck of the lawn mower to the area underneath the deck of the lawn mower; and controlling, by the controller, an action of the task arm based at least in part on the sensing data to perform a sharpening task on the one or more blades while underneath the deck of the lawn mower.

12. The method of claim 11, further comprising:

receiving, by the controller, a control signal from a remote device that initiates the sharpening task.

13. The method of claim 11, further comprising:

receiving, by the controller from a remote device, lawn mower configuration information indicative of a blade configuration of the lawn mower; and wherein controlling the action of the task arm to perform the sharpening task is based in part on the lawn mower configuration information.

14. The method of claim 11, wherein the one or more positioning sensors include a camera, and wherein the method further comprises:

capturing a video feed by the camera of the lawn mower maintenance robot; and streaming, by a transmitter, the video feed to a remote viewing device.

15. The method of claim 11, further comprising:

navigating, by the controller, the lawn mower maintenance robot around a radius of the lawn mower to detect a suitable entry point to the area underneath the deck; and configuring, by the controller, the lawn mower maintenance robot to navigate to the area underneath the deck via the entry point.

16. The method of claim 15, wherein detecting the suitable entry point comprises:

detecting, based on the sensing data, locations of wheels of the lawn mower; and detecting the suitable entry point located between the wheels.

17. The method of claim 11, wherein navigating the lawn mower maintenance robot comprises:

navigating to a first cutting edge of a first blade to perform sharpening of the first cutting edge of the first blade;

navigating to a second cutting edge of the first blade to perform sharpening of the second cutting edge of the first blade;

navigating to a cutting edge tip of a second blade to perform sharpening of the first cutting edge of the second blade; and navigating to a second cutting edge of the second blade to perform sharpening of the second cutting edge of the second blade.

18. The method of claim 11, further comprising:

controlling, by the controller, one or more electronically-controlled components to automatically grab the one or more blades of the lawn mower;

controlling, by the controller, the one or more electronically-controlled components to remove the one or more blade from the lawn mower; and controlling, by the controller, the one or more electronically-controlled components to attach one or more replacement blades to the lawn mower.

19. The method of claim 11, further comprising:

scanning the lawn mower by a scanning component; and automatically identifying, by the controller, a characteristic of the lawn mower including at least one of a type, size, age, and condition of the lawn mower blade.

20. A lawn mower maintenance system, comprising:

a lawn mower maintenance robot comprising:

a robot body having a form factor suitable for accessing an area underneath a deck of a lawn mower while the lawn mower is resting on the ground;

a set of wheels on an underside of the robot body;

a motor in the robot body to drive the set of wheels;

at least one task arm coupled to an upper surface of the robot body, wherein the at least one task arm includes a sharpening tip suitable for performing sharpening of one or more blades of the lawn mower underneath the deck;

one or more positioning sensors to generate sensing data indicative of position of the robot body relative to the lawn mower and indicative of position of the sharpening tip relative to the one or more blades of the lawn mower; and a controller configured to obtain the sensing data from the one or more positioning sensors, to autonomously control the motor based on the sensing data to navigate the lawn mower maintenance robot from a starting position outside the deck of the lawn mower to the area underneath the deck of the lawn mower, and the controller configured to control an action of the task arm based at least in part on the sensing data to perform a sharpening task on the one or more blades while underneath the deck of the lawn mower; and a remote control device to send a control signal to the lawn mower maintenance robot to initiate the sharpening task and to receive sensor data from the controller indicative of a status of the sharpening task.

* * * * *